United States Patent [19]

Mogamiya et al.

[11] Patent Number: 5,110,496
[45] Date of Patent: May 5, 1992

[54] LIQUID CRYSTAL COMPOUND

[75] Inventors: Hiroyuki Mogamiya; Noriko Yamakawa; Yoshiichi Suzuki, all of Tokyo; Hitoshi Suenaga; Yasuhiro Hasegawa, both of Hyogo, all of Japan

[73] Assignees: Showa Shell Sekiyu Kabushiki Kaisha, Tokyo; Teikoku Chemical Industry Co., Ltd., Hyogo, both of Japan

[21] Appl. No.: 663,313

[22] Filed: Mar. 1, 1991

[30] Foreign Application Priority Data

Mar. 1, 1990 [JP] Japan .................... 2-50125
Jul. 10, 1990 [JP] Japan .................... 2-182267

[51] Int. Cl.$^5$ .............. C09K 19/34; C09K 19/20; C09K 19/22; C07D 239/00
[52] U.S. Cl. .............. 252/299.61; 252/299.64; 252/299.65; 252/299.66; 252/299.67; 359/104; 544/242; 544/244; 544/245; 544/298; 544/315; 544/316; 544/335; 544/406; 544/408; 544/409; 560/8; 560/18; 560/20; 560/21; 560/22; 560/23; 560/55; 560/59
[58] Field of Search ........... 252/299.01, 299.6, 299.61, 252/299.62, 299.63, 299.64, 299.65, 299.66, 299.67, 299.68; 350/358 R; 544/242, 244, 245, 298, 315, 316, 335, 406, 408, 409; 558/271; 560/8, 18, 20, 21, 22, 23, 55, 59, 61, 64, 65, 73, 76, 102

[56] References Cited

U.S. PATENT DOCUMENTS

| | | | |
|---|---|---|---|
| 4,867,903 | 9/1989 | Nohira et al. | 252/299.61 |
| 4,918,213 | 4/1990 | Nohira et al. | 558/271 |
| 4,921,632 | 5/1990 | Nakamura et al. | 252/299.1 |

FOREIGN PATENT DOCUMENTS

327349 8/1989 European Pat. Off.
334628 9/1989 European Pat. Off.

OTHER PUBLICATIONS

Suzuki et al., New Fluorine-Containing Ferroelectric Liquid Compounds Showing Tristable Switching, 6 *Liquid Crystals* 167–174 (1989).

Chandani et al., Novel Phases Exhibiting Tristable Switching 28 *Japanese Journal of Applied Physics* L1261 (1989).

Chandani et al., Antiferroelectric Chiral Smetic Phases Responsible for the Tristable Switching in MHPOBC, 28 *Japanese Journal of Applied Physics* L1265 (1989).

Suzuki et al., New Fluorine-Containing Ferroelectric Liquid Crystal Compounds with Large Spontaneous Polarization and Fast Switching, Time, Twelfth In'tl Liquid Crystal Conf. Abstract No. SY02 (Freiburg, Aug. 15–19, 1988).

Suzuki et al., Fluorine Containing Ferroelectric Liquid Crystal Compounds Showing Tristable Switching Abstract P 106, Second Int'l; Conf. on Ferroelectric Liquid Crystala, (Jun. 27–30, 1989).

Inui et al., First Order Paraelectric-Antiferroelectric Phase Transition in a Chiral Smectic Liquid Phase Crystal of a Fluorine Containing Phenyl Pyrimidine Derivative, 29 *Japanese Journal Applied Physics* L 987–990 (Jun. 1990).

*Primary Examiner*—Robert L. Stoll
*Assistant Examiner*—Shean C. Wu
*Attorney, Agent, or Firm*—Cushman, Darby & Cushman

[57] ABSTRACT

An optically active liquid crystal compound which is represented by the formula:

$$R_1-X-(A)-Y-(B)-Z-\overset{R_3}{\underset{*}{C}H}-R_2$$

wherein $R_1$ and $R_2$ each represents an alkyl or aralkyl group of 4–18 carbon atoms, $R_3$ represents a haloalkyl group, X represents O, COO, OCO, CO or a single bond, Y represents COO, OCO, $CH_2O$ or $OCH_2$, Z represents COO or O, (A) represents a cyclic group shown by (Abstract continued on next page.)

(B) represents a cyclic group shown by
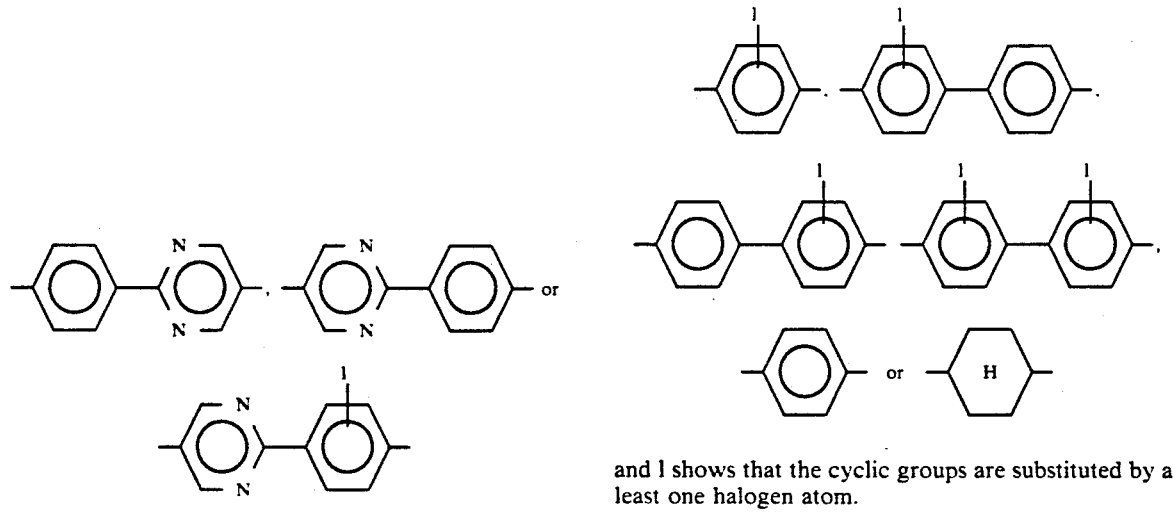
and l shows that the cyclic groups are substituted by at least one halogen atom.
10 Claims, 29 Drawing Sheets

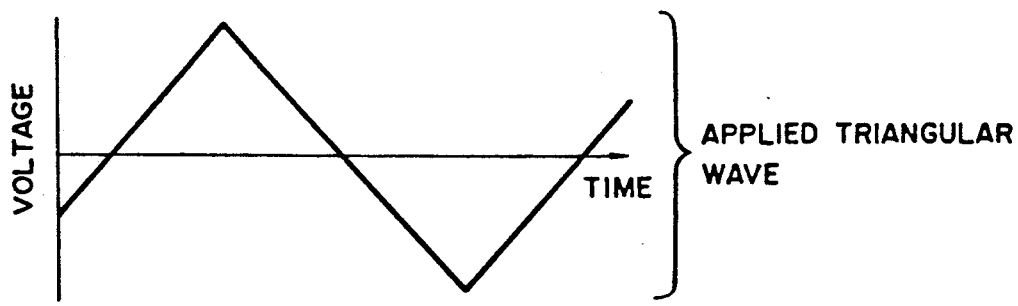
FIG. 1A — APPLIED TRIANGULAR WAVE
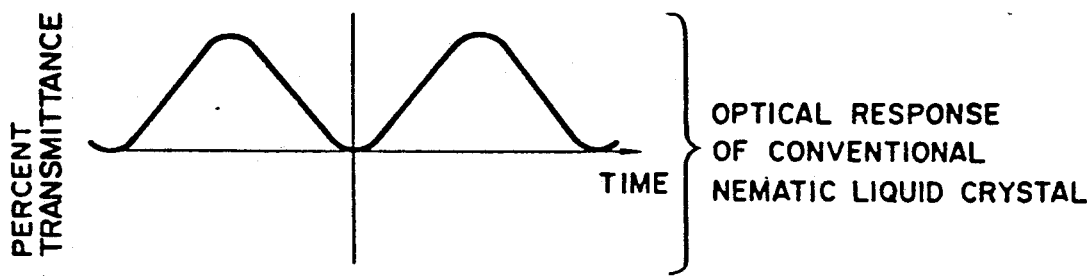
FIG. 1B — OPTICAL RESPONSE OF CONVENTIONAL NEMATIC LIQUID CRYSTAL
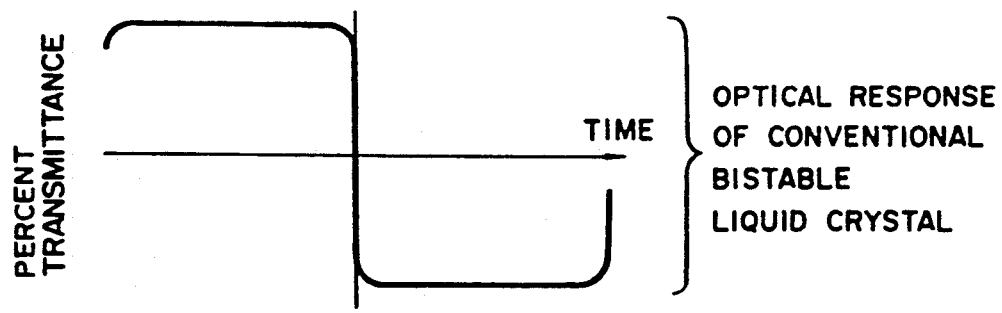
FIG. 1C — OPTICAL RESPONSE OF CONVENTIONAL BISTABLE LIQUID CRYSTAL
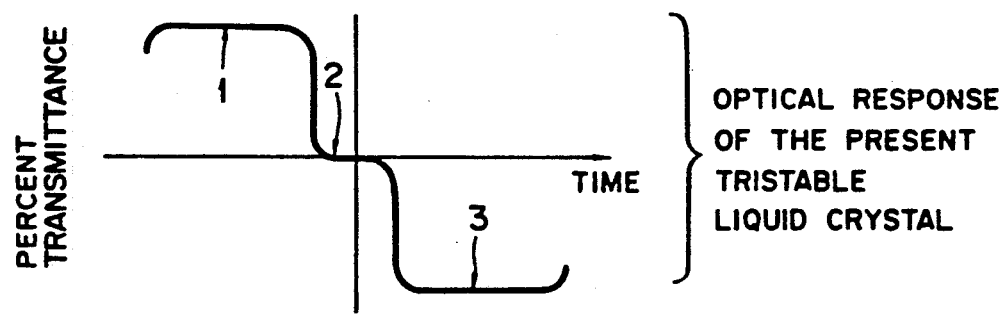
FIG. 1D — OPTICAL RESPONSE OF THE PRESENT TRISTABLE LIQUID CRYSTAL

LIQUID CRYSTAL COMPOUND

The present invention relates to a liquid crystal substance suitable to be used for electro-optic devices utilizing response of chiral smectic liquid crystal to electric fields and particularly to a ferroelectric liquid crystal substance containing a pyrimidine ring and a liquid crystal substance which has an optically tristable state.

As liquid crystal display devices, TN type, STN type, Gest-Host type, etc. have been developed and practically used because of their excellent characteristics such as (1) low-voltage driving, (2) low power consumption, (3) thin type display, and (4) passive display.

However, a widely used display at present which use nematic liquid crystal have the defect that response speed is low, namely, a few msec to some ten msec and are restricted in their applications.

In order to solve these problems, STN type and active matrix type which use a thin layer transistor have been developed. The STN type display devices have been improved in display quality such as display contrast and viewing angle, but they suffers from the problems that high accuracy is required for control of cell gap and tilt angle and the response speed is somewhat low.

Therefore, development of a novel liquid crystal display system having excellent in responsiveness has been demanded and development of ferroelectric liquid crystal which may make it possible to provide an ultrahigh speed device which has a very short optical response time in the order of $\mu$ sec has been attempted.

At ferroelectric liquid crystals, DOBAMBC (p-decyloxybenzylidene-p-amino-2-methylbutylcinnamate) was synthesized for the first time by Meyer et al in 1975.

Furthermore, ferroelectric liquid crystals have attracted much notice since Clark and Lagerwall reported the characteristics of DOBAMBC on display devices such as high speed response of submicrosecond and memory characteristics [N. A. Clark et al, Appln. Phys. Lett. 36.899(1980)].

However, their devices have many technical problems for practical use and especially, there have been no materials which show ferroelectric crystal property at room temperature and besides, there have been established no methods effective and practical for control of orientation of liquid crystal molecules which is essential for display devices.

Since the above report was made, various attempts have been conducted from the both aspects of liquid crystal material/device and a display device which utilizes switching between twist binary states has been manufactured for trial, but neither high contrast nor proper threshold value have been obtained.

From such viewpoint, other switching systems have been investigated and transitional scattering systems have been proposed. Thereafter, the inventors reported ternary state switching system of liquid crystal having tristable state in 1988. [A. D. L. Chandani, T. Hagiwara, Y. Suzuki et al., Japan. J. of Appl. Phys., 27,(5), L729-L732 (1988)].

The above-mentioned term "having tristable state" means that in a liquid crystal electro-optic device where ferroelectric liquid crystals are laid between the first electrode substrate plate and the second electrode substrate plate which is apart at a given space from the first one and it is constructed so that an electric voltage for formation of electric field is applied to both the first and second electrode substrate plates, when voltage in the form of a triangular wave as shown in FIG. 1A is applied, the ferroelectric liquid crystals have molecular orientation of the first stable state (FIG. 1D, 2) where no electric field is applied and have the molecular orientation of the second stable state (FIG. 1D, 1) upon application of electric field which is different from the first stable state in one of the electric field directions and further have the molecular orientation of the third stable state (FIG. 1D, 3) which is different from the first and second stable states in the other direction of electric field.

The ternary state switching system comprises application of a clear threshold characteristics and hysteresis characteristics for driving voltage which are shown by liquid crystal S*(3) phase having tristable state which is fundamentally different from the conventional bistable state in molecular orientation and is considered to be an epochal driving method which can realize a moving image display of a large plane by a simple matrix system.

Furthermore, performance of display device which uses liquid crystals having tristable state depends greatly upon the form of hysteresis which is a property inherent to tristable state liquid crystal. In the case of the hysteresis having the form as shown in FIG. 2, an ideal dark state can be realized at 0 V, but leakage of light occurs when voltage is increased from 0 V to V1 or is decreased from 0 V to −V1. It can be said that liquid crystals which show tristable state having such hysteresis is inferior in memory effect. This phenomenon brings about reduction in contrast of display devices.

On the other hand, in the case of the hysteresis as shown in FIG. 3, the ideal dark state realized at 0 V is maintained at a voltage of up to V2 or −V2 and memory effect in dark state can be said to be superior. Thus, contrast in the display device is superior.

Liquid crystal compounds which have S*(3) phase having tristable state in phase series were reported in Japanese Patent Kokai (Laid-Open) Nos. Hei 1-316367, 1-316372, 1-316339, and 2-28128 filed by the inventors and 1-213390 filed by Ichihashi et al, but the liquid crystal compounds of the present invention has not been known. There is no disclosure of liquid crystal having tristable states which shows good memory effect.

As a result of intensive research conducted by the inventors on liquid crystal compounds containing a heterocyclic ring for solving the above problems, it has been found that liquid crystal compounds having a pyrimidine ring as heterocyclic ring are chemically and photochemically stable, have a large dielectric anisotropy, and have a S*(3) phase of liquid crystal having tristable state which has not been obtained by the conventional ferroelectric liquid crystals.

That is, the object of the present invention is to provide a novel liquid crystal compound containing a pyrimidine ring which is expected to be applied to new electro-optic devices or liquid crystal display which utilize the liquid crystal phase S*(3) having tristable state.

BRIEF DESCRIPTION OF THE DRAWINGS

FIG. 1A shows the applied triangular wave, FIG. 1B shows optical response characteristics of conventional nematic liquid crystals, FIG. 1C shows optical response characteristics of conventional bistable state liquid crystals, and FIG. 1D shows optical response characteristics of tristable state liquid crystals of the present invention.

FIGS. 30a and 31a show the applied triangular wave voltage, and FIGS. 30b and 31b show hysteresis of change in light transmittance of Examples 30 and 31, respectively, for the applied triangular wave voltage.

Figure 2:
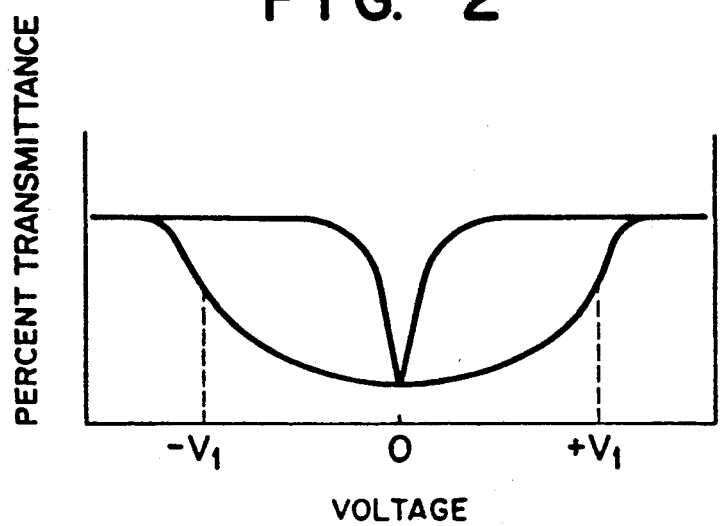
FIG. 2 shows hysteresis inferior in memory effect of dark portion of tristable state liquid crystals.
Figure 3:
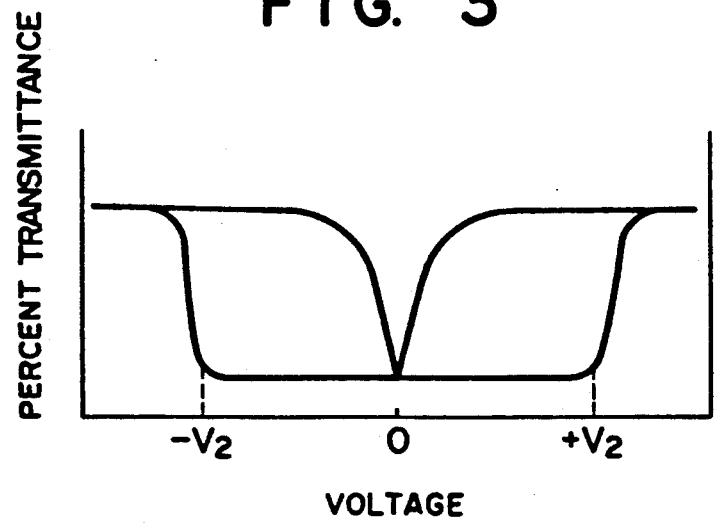
FIG. 3 shows hysteresis good in memory effect of dark portion of tristable state liquid crystals.

The present invention relates to a liquid crystal compound which is represented by the formula:

$$R_1-X-(A)-Y-(B)-Z-\overset{R_3}{\underset{\bullet}{C}}H-R_2$$

[wherein $R_1$ and $R_2$ each represents an alkyl or aralkyl group of 4-18 carbon atoms, $R_3$ represents a haloalkyl group, X represents O, COO, OCO, CO or a single bond, Y represents COO, OCO, CH$_2$O or OCH$_2$, Z represents COO or O, (A) represents a cyclic group shown by (B) represents a cyclic group shown by and l shows that the cyclic groups are substituted by at least one halogen atom.

The above haloalkyl group includes, for example, CH$_2$F, CHF$_2$, CF$_3$, C$_2$F$_5$, CClF$_2$, CCl$_3$, and CF$_3$CCl$_2$ CF$_3$ and C$_2$F$_5$ are most preferred. As l, F atom is most preferred and then Cl and Br are preferred with the former being more preferred than the latter.

Specific examples of the compounds of the present invention will be enumerated below. 4-(1,1,1-trifluoro-2-alkyloxycarbonyl)fluorophenyl 4-(5-alkyl-2-pyrimidyl)phenyl-4'-carboxylate 4-(1,1,1-trifluoro-2-alkyloxycarbonyl)phenyl 4-(5-alkyl-2-pyrimidyl)-fluorophenyl -4'-carboxylate 4-(1,1,1-trifluoro-2-alkyloxycarbonyl)fluorophenyl 4-(5-alkyl-2-pyrimidyl)-fluorophenyl-4'-carboxylate 4-(1,1,1-trifluoro-2-alkyloxycarbonyl)fluorophenyl 4-(5-alkoxy-2-pyrimidyl)phenyl-4'-carboxylate 4-(1,1,1-trifluoro-2-alkyloxycarbonyl)phenyl 4-(5-alkoxy-2-pyrimidyl)-fluorophenyl-4'-carboxylate 4-(1,1,1-trifluoro-2-alkyloxycarbonyl)fluorophenyl 4(5-alkoxy-2-pyrimidyl)fluorophenyl-4'-carboxylate (5-alkyloxy-carbonyl-2-pyrimidyl)phenyl-4'-carboxylate 4-(1,1,1-trifluoro-2-alkyloxycarbonyl)phenyl 4-(5- alkyloxycarbonyl-2-pyrimidyl)fluorophenyl-4'-carboxylate
4-(1,1,1-trifluoro-2-alkyloxycarbonyl)fluorophenyl 4-(5 4-alkyloxycarbonyl-2-pyrimidyl)fluorophenyl-4'-(1,1,1 4-trifluoro-2-alkyloxycarbonyl)fluorobiphenyl 4-(5-alkyl-2-pyrimidyl)phenyl-4'-carboxylate 4-(1,1,1-trifluoro-2-alkyloxycarbonyl)biphenyl 4-(5-alkyl-2-pyrimidyl)fluorophenyl-4'-carboxylate 4-(1,1,1-trifluoro-2-alkyloxycarbonyl)fluorobiphenylcyclohexyl 4-(5-alkyl-2-pyrimidyl)fluorophenyl-4'-carboxylate 2-(1,1,1-trifluoro-2-alkyloxycarbonyl)cyclohexyl 4(5-alkyl-2-pyrimidyl)fluorophenyl-4'-carboxylate 4-(1,1,1-trifluoro-2-alkyloxycarbonyl)fluorophenylcyclohexyl 4-(5-alkyl-2-pyrimidyl)fluorophenyl-4'carboxylate 2-(4-alkylphenyl)-5- 4-(1,1,1-trifluoro-2-alkyloxycarbonyl)-fluorophenyloxycarbonyl]pyrimidine 2-(4-alkoxylphenyl)-5-[4-(1,1,1-trifluoro-2-alkyloxycarbonyl)fluorophenyloxycarbonyl]pyrimidine 2-(4-alkyloxycarbonyl-phenyl)-5-[4-(1,1,1-trifluoro-2-alkyloxycarbonyl)fluorophenyloxycarbonyl pyrimidine 4-(5-alkyl-2-pyrimidyl)-phenyl 4-(1,1,1-trifluoro-2-alkyloxycarbonyl)fluorobenzoate 4-(5-alkyl-2-pyrimidyl)fluorophenyl 4-(1,1,1-trifluoro-2-alkyloxycarbonyl)benzoate 4-(5-alkyl-2-pyrimidyl)fluorophenyl 4-(1,1,1-trifluoro-2-alkyloxycarbonyl)fluorobenzoate 4-(5-alkoxy-2-pyrimidyl)phenyl 4-(1,1,1-trifluoro-2alkyloxycarbonyl)fluorobenzoate 4-(5-alkoxy-2-pyrimidyl)fluorophenyl 4-(1,1,1- trifluoro-2-alkyloxycarbonyl)fluorobenzoate 4-(5-alkoxy-2-pyrimidyl)fluorophenyl 4-(1,1,1-trifluoro-2-alkyloxycarbonyl)fluorobenzoate 4-(5-alkyloxycarbonyl-2-pyrimidyl)phenyl 4-(1,1,1-trifluoro-2-alkyloxycarbonyl)fluorobenzoate 4-(5-alkyloxycarbonyl-2-pyrimidyl)fluorophenyl 4(1,1,1-trifluoro-2-alkyloxycarbonyl)benzoate 4-(5-alkyloxycarbonyl-2-pyrimidyl)-fluorophenyl 4(1,1,1-trifluoro-2-alkyloxycarbonyl)-fluorobenzoate , TM 4-(5-alkyl-2-pyrimidyl)phenyl 4-(1,1,1-trifluoro-2-alkyloxycarbonyl)fluorophenylbenzoate 4-(5-alkyl-2-pyrimidyl)fluorophenyl 4-(1,1,1-trifluoro-2-alkyloxycarbonyl)phenylbenzoate 4-(5-alkyl-2-pyrimidyl)fluorophenyl 4-(1,1,1-trifluoro-2-alkyloxycarbonyl)fluorophenylbenzoate 4-(5-alkoxy-2-pyrimidyl)phenyl 4-(1,1,1-trifluoro-2alkyloxycarbonyl)fluorophenylbenzoate 4-(5-alkoxy-2-pyrimidyl)-fluorophenyl 4-(1,1,1-trifluoro-2-alkyloxycarbonyl)-phenylbenzoate 4-(5-alkoxy-2-pyrimidyl)fluorophenyl 4-(1,1,1-trifluoro-2-alkyloxycarbonyl)fluorophenylbenzoate 4-(5-alkyloxycarbonyl-2-pyrimidyl)phenyl 4-(1,1,1-trifluoro-2-alkyloxycarbonyl)fluorophenylbenzoate 4-(5-alkyloxycarbonyl-2-pyrimidyl)fluorophenyl 4(1,1,1-trifluoro-2-alkyloxycarbonyl)phenylbenzoate 4-(5-alkyloxycarbonyl-2-pyrimidyl)fluorophenyl 4(1,1,1-trifluoro-2-alkyloxycarbonyl)fluorophenylbenzoate 4-(5-alkyl-2-pyrimidyl)fluorophenyl 4-(1,1,1- trifluoro-2-alkyloxycarbonyl)cyclohexylcarboxylate 4-(5-alkoxy-2-pyrimidyl)fluorophenyl 4-(1,1,1-trifluoro-2-alkyloxycarbonyl)cyclohexylcarboxylate 4-(5-alkyloxycarbonyl-2-pyrimidyl)fluorophenyl 4-(1,1,1 -trifluoro-2-alkyloxycarbonyl)cyclohexylcarboxylate 2-(4-alkylphenyl)-5- [4-(1,1,1-trifluoro-2-alkyloxycarbonyl)-fluorophenylcarbonyloxypyrimidine 2-(4-alkoxyphenyl)-5-[4-(1,1,1-trifluoro-2alkyloxycarbonyl)fluorophenylcarbonyloxy pyrimidine 2-(4-alkyloxycarbonyl-phenyl)-5-[4-(1,1,1-trifluoro-2alkyloxycarbonyl)fluorophenylcarbonyloxy]pyrimidine 2-(4-alkylphenyl)-5-[4-(1,1,1-trifluoro-2alkyloxycarbonyl)fluorobiphenylcarbonyloxy.]pyrimidine 2-(4-alkoxyphenyl)-5-[4-(1,1,1-trifluoro-2alkyloxycarbonyl)fluorobiphenylcarbonyloxypyrimidine 2-(4-alkyloxycarbonylphenyl)-5-4-(1,1,1-trifluoro-2-alkyloxycarbonyl)fluorobiphenylcarbonyloxy pyrimidine 1,1,1-trifluoro-2-alkyl 4-[4-(5-alkyl-2pyrimidyl)phenylcarbonyloxy fluorobenzoate 1,1,1-trifluoro-2-alkyl 4-[4-(5-alkoxy-2-pyrimidyl)fluorophenylcarbonyloxybenzoate 1,1,1-trifluoro-2-alkyl 4-[4-(5-alkyloxycarbonyl-2pyrimidyl)fluorophenylcarbinyloxyfluorobenzoate 1,1,1-trifluoro-2-alkyl 4-[2-alkylphenyl-5pyrimidylcarbinyloxy)fluorobenzoate 1,1,1-trifluoro-2-alkyl 4-[2-alkoxyphenyl-5pyrimidylcarbinyloxy)fluorobenzoate 1,1,1-trifluoro-2-alkyl 4-[2-alkyloxycarbonyl-5pyrimidylcarbinyloxy)fluorobenzoate 1,1,1-trifluoro-2-alkyl 4-[4-(5-alkyl-2pyrimidyl)-phenyloxycarbinyl]fluorobenzoate 1,1,1-trifluoro-2-alkyl 4-[4-(5-alkoxy-2pyrimidyl)fluorophenyloxycarbiny benzoate 1,1,1-trifluoro-2-alkyl 4-[4-(5-alkyloxycarbonyl-2pyrimidyl)fluorophenyloxycarbinyl]-fluorobenzoate 1,1,1-trifluoro-2-alkyl 4-[2-alkylphenyl-5pyrimidyloxycarbinyl]fluorobenzoate 1,1,1-trifluoro-2-alkyl 4-[2-alkoxyphenyl-5pyrimidyloxycarbinyl]fluorobenzoate 1,1,1-trifluoro-2-alkyl 4-.[2-alkyloxycarbonyl-5-pyrimidyloxycarbinyl]fluorobenzoate Furthermore, there may also be exemplified the above compounds in which $CF_3$ group is replaced with $CH_2F$ group, $CHF_2$ group or $C_2F_5$ group or F atom is replaced with Cl atom.

Examples of the processes for preparation of the compound of the present invention is shown below.

(1) An alcohol and hydrogen chloride were added to 4-benzyloxybenzonitrile and then, ammonia was further added thereto to obtain 4(benzyloxy)benzamidine hydrochloride (1).

Then, diethyl alkyl($R_2$)malonate was added to the above compound (1) in the presence of an alcoholate. The resulting compound was treated with a halogenating agent and then was subjected to catalytic reduction to obtain 2-(4-hydroxyphenyl)-5-alkylpyrimidine (2).

Separately, thionyl chloride was added to a halogen substituted terephthalic acid to obtain terephthalic acid chloride. To the chloride was added an optically active 1-fluoroalkyl-alkanol having optical purity of 90% ee or more and these were allowed to react in methylene chloride and pyridine under ice-cooling to obtain a halogen substituted 4-(1-fluoroalkylalkoxycarbonyl)-benzoic acid (3).

The above compound (2) and compound (3) were esterified to obtain 4-(5-alkyl-2-pyrimidinyl)phenyl halogen-substituted 4-(1-fluoroalkylalkoxycarbonyl)-benzoate (4) which is the objective compound of the present invention.

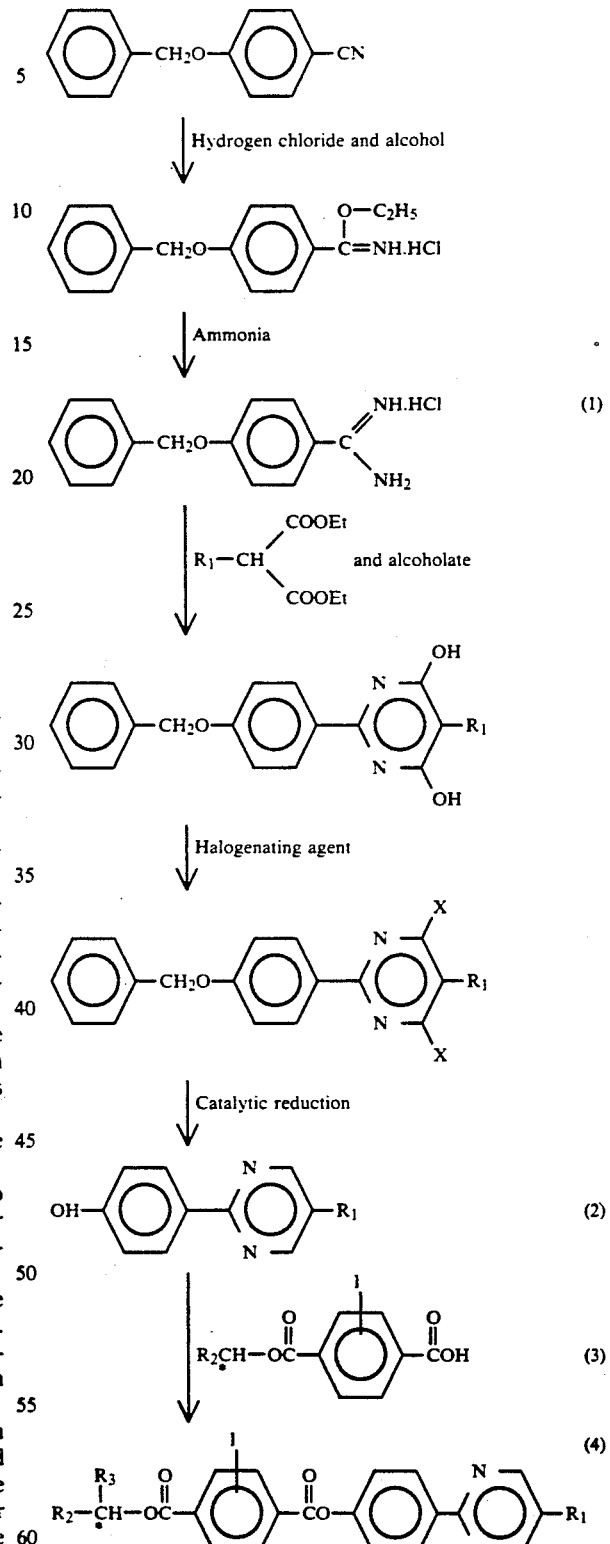

(2) (a) Commercially available 5-alkyl-2-(4'-cyanophenyl)-pyrimidine was refluxed together with potassium hydroxide in diethylene glycol and then, the reaction mixture was introduced into a mixed solvent of methanol-concentrated hydrochloric acid =2:1 and was stirred. The resulting crystal was collected and recrystallized from ethanol to obtain 4-(n-alkyl-2-pyrimidyl)benzoi acid (5). Then, this compound (5) was refluxed in excess thionyl chloride to obtain chloride (6).

(b) Halogen-substituted benzyloxybenzoic acid was refluxed in excess thionyl chloride to obtain its chloride (7). To this chloride was added optically active 1-fluoroalkyl-alkanol and these were allowed to react in methylene chloride in the presence of triethylamine to obtain the corresponding a halogen-substituted 4-benzyloxybenzoate (8). Then, this was subjected to catalytic reduction to obtain halogen-substituted 4-hydroxybenzoate (9).

(c) The above compound (6) was allowed to react with the above compound (9) in methylene chloride in the presence of triethylamine to obtain the objective 4-(1-fluoroalkyl-2-alkyloxycarbonyl)halogen-substituted phenyl 5-(5-alkyl-2-pyrimidyl)phenyl-4'-carboxylate (10).

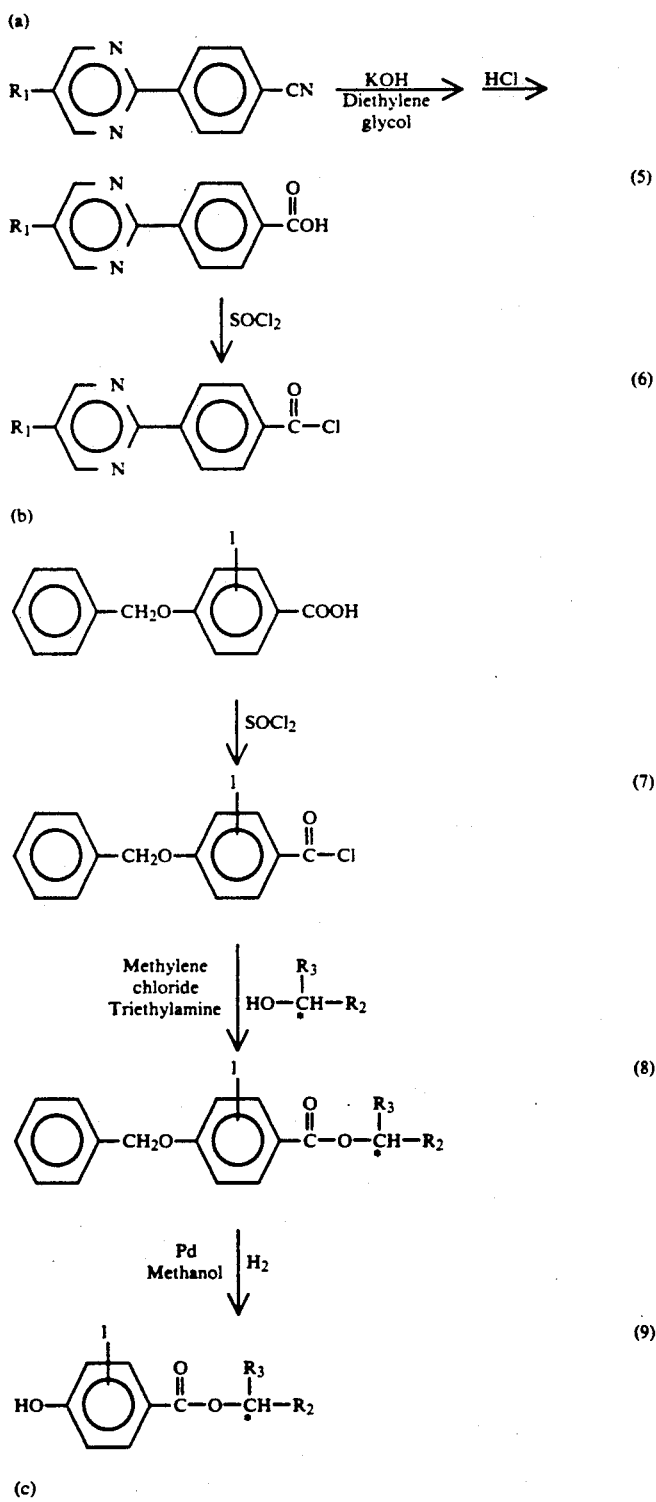

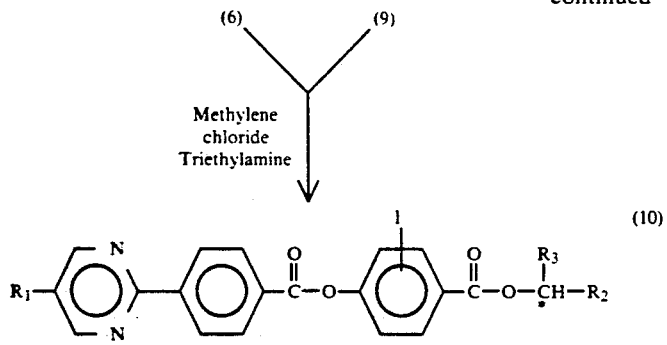

(10)

EXAMPLE 1

Preparation of 3-fluoro-4-(1,1,1-trifluoro-2-octyloxycarbonyl)-phenyl 4-(5-n-decylpyrimidine-2-yl)benzoate

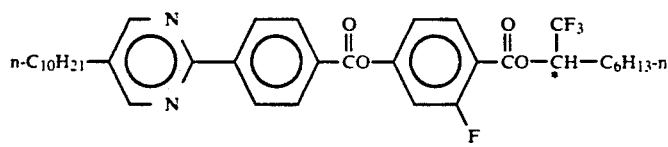

(1) 1,1,1-Trifluoro-2-octyl 2-fluoro-4-benzyloxybenzoate

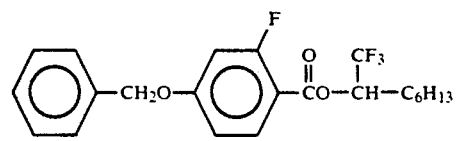

(1) 1,1,1-Trifluoro-2-octyl 2-fluoro-4-benzyloxybenzoate

2-Fluoro-2-benzyloxybenzoic acid chloride (2.7 g) was dissolved in methylene chloride (30 ml) and to the resulting solution was gradually added under ice cooling a solution of optically active 1,1,1-trifluoro-2-octanol (1.8 g), dimethylaminopyridine (0.3 g) and triethylamine (1.5 g) in methylene chloride (50 ml).

After the temperature of the reaction mixture was returned to room temperature, reaction was allowed to proceed for 24 hours and the resulting reaction mixture was poured into ice water and was extracted with methylene chloride. The methylene chloride layer was washed with dilute hydrochloric acid, water, 1N aqueous sodium carbonate solution, and water in the order and dried over anhydrous magnesium sulfate and the solvent was distilled off to obtain a crude product. The product was subjected to toluene-silica gel column chromatography and was further recrystallized from ethanol to obtain the titled compound (2.5 g).

(2) 1,1,1-Trifluoro-2-octyl 3-fluoro-4-hydrobenzoate (2) 1,1,1-Trifluoro-2-octyl 3-fluoro-4-hydrobenzoate

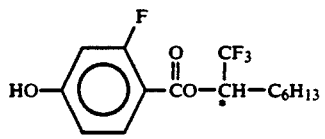

To a solution of the compound obtained in the above (1) in methanol (100 ml) was added 10% Pd carried on carbon (0.25 g) and the mixture was subjected to hydrogenation reaction under hydrogen atmosphere to obtain the titled compound (1.8 g).

(3) 4-(5-n-Decyl-2-pyrimidyl)benzoic acid

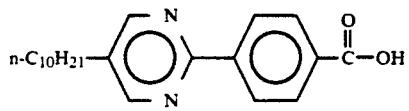

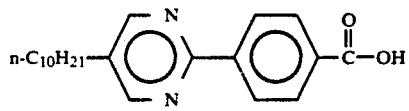

5-n-Decyl-2-(4'-cyanophenyl)pyrimidine (2.0 g) was refluxed together with diethyl glycol (15 ml) and potassium hydroxide (1.0 g) for 1 day. The reaction mixture was poured in a mixed solution of water (100 ml) and concentrated hydrochloric acid (50 ml) and the mixture was stirred for half a day under heating. The precipitated crystal was collected and washed with water and then recrystallized from ethanol to obtain the titled compound (2.0 g).

(4) 4-(5-n-Decyl-2-pyrimidyl)benzoic acid chloride

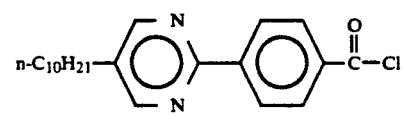

4-(5-n-Decyl-2-pyrimidyl)benzoic acid (2.0 g) prepared in the above (3) was added to thionyl chloride (10 g) and a slight amount of N,N-dimethylformaide was added thereto and the mixture was refluxed for 4 hours. Excess thionyl chloride was distilled off to obtain the titled compound (2.1 g).

(5) 3-Fluoro-4-(1,1,1-trifluoro-2-octyloxycarbonyl)phenyl 4-(5-n-decyl-2-pyrimidyl)phenyl-4'-carboxylate

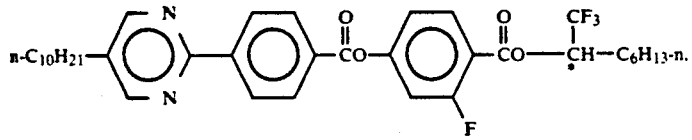

Optically active 1,1,1-trifluoro-2-octyl 3-fluoro-4-hydroxybenzoate (1.8 g) prepared in the above (2) and triethylamine (0.83 g) were dissolved in methylene chloride (30 ml).

4-(5-n-Decyl-2-pyrimidyl)benzoic acid chloride (2.1 g) prepared in (4) was dissolved in methylene chloride (30 ml) and this solution was gradually added dropwise to the above prepared solution. Thereto was further added a solution of dimethylaminopyridine (0.2 g) in methylene chloride (10 ml). The mixture was stirred at room temperature for 24 hours. The reaction mixture was poured in water and pH was adjusted to neutrality and then, the methylene chloride layer was separated. This methylene chloride layer was dried over anhydrous magnesium sulfate and then, methylene chloride was distilled off. The residue was purified by silica gel column chromatography (hexane/ethyl acetate=96/4 in volume ratio) to obtain the titled compound (2.1 g).

This compound had phase transition temperatures which were observed under a polarizing microscope with a hot stage as follows:

$$Cry \xleftarrow{45°C.} S^*(3) \xleftarrow{60°C.} S^*c \xleftarrow{67°C.} Iso$$

where S*(3) shows tristable state liquid crystal phase.
IR spectrum cm$^{-1}$ (KBr):
2938, 2864, 1742,
1542, 1442, 1267,
1185, 1110, 730.

EXAMPLE 2

Preparation of
3-fluoro-4-(1,1,1-trifluoro-2-decyloxycarbonyl)phenyl 4-(5-n-decylpyrimidine-2-yl)benzoate

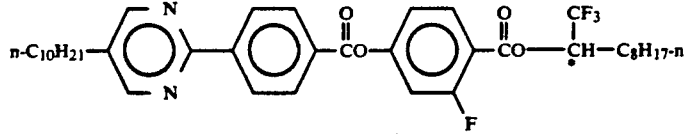

The titled compound was prepared in the same manner as in Example 1 except that optically active 1,1,1-trifluoro-2-decanol was used in place of the optically active 1,1,1-trifluoro-2-octanol.

Phase transition temperatures of this compound observed under a polarizing microscope with a hot stage were as follows:

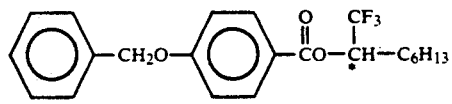

Infrared spectrum cm$^{-1}$ (KBr):
2932, 2860, 1729,
1549, 1446, 1265,
1185, 1110, 730

EXAMPLE 3

(1) Preparation of 1,1,1-trifluoro-2-octyl 4-benzyloxybenzoate

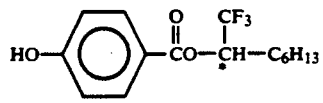

4-Benzyloxybenzoic acid chloride (4.3 g) was dissolved in methylene chloride (50 ml) and to the resulting solution was gradually added under ice cooling a solution of optically active 1,1,1-trifluoro-2-octanol (2.9 g), dimethylaminopyridine (0.6 g) and triethylamine (1.7 g) in methylene chloride (50 ml).

After the temperature of the reaction mixture was returned to room temperature, reaction was allowed to proceed for 24 hours and the resulting reaction mixture was poured into ice water and was extracted with methylene chloride. The methylene chloride layer was washed with dilute hydrochloric acid, water, 1N aqueous sodium carbonate solution, and water in the order and dried over anhydrous magnesium sulfate and the solvent was distilled off to obtain a crude product. The product was subjected to toluene-silica gel column chromatography and was further recrystallized from ethanol to obtain the titled compound (3.8 g).

(2) Preparation of 1,1,1-trifluoro-2-octyl 4hydroxybenzoate

To a solution of the compound obtained in the above (1) in methanol (100 ml) was added 10% Pd carried on carbon (0.4 g) and the solution was subjected to hydrogenolysis reaction under hydrogen atmosphere to obtain the titled compound (2.8 g).

(3) Preparation of
4-(1,1,1-trifluoro-2-octyloxycarbonyl)phenyl
4-(5-n-Dodecyloxypyrimidine-2-yl)benzoate

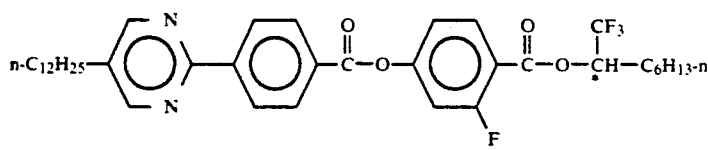

4-(5-n-Dodecyloxypyrimidine-2-yl)benzoic acid (3.0 g) together with excess thionyl chloride were heated for 6 hours under refluxing and thereafter, unaltered thionyl chloride was distilled off to obtain 4-(5-n-dodecyloxypyrimidine-2-yl)phenylcarboxylic acid chloride.

To a solution of this acid chloride in methylene chloride (50 ml) was gradually added under ice cooling a solution of 1,1,1-trifluoro-2-octyl 4-hydroxybenzoate (2.8 g) prepared hereabove, triethylamine (1.0 g) and dimethylaminopyrimidine (0.3 g) in methylene chloride (50 ml) and reaction was allowed to proceed for 24 hours at room temperature.

Then, the reaction mixture was poured in ice water and was extracted with methylene chloride. The methylene chloride layer was washed with dilute hydrochloric acid, water, aqueous sodium carbonate solution, and water in this order and was dried over anhydrous sodium sulfate and then, the solvent was distilled off to obtain a crude product. This was purified by toluene-silica gel column chromatography to obtain the titled optically active product (2.0 g).

This compound had phase transition temperatures (° C) which were observed under a polarizing microscope using a hot stage.

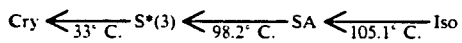

where S*(3) shows optically tristable state liquid crystal phase.

EXAMPLE 4

Preparation of
4-(1,1,1-trifluoro-2-octyloxycarbonyl)phenyl
2-(4-n-octyloxyphenyl)-pyrimidine-5-yl-carboxylate

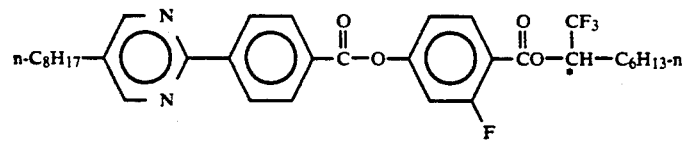

1,1,1-Trifluoro-2-octyl 4-hydroxybenzoate (0.50 g) prepared in (2) of Example 3 and triethylamine (0.17 g) were dissolved in methylene chloride (30 ml). To the resulting solution was gradually added dropwise a solution of 2-(4-n-octyloxyphenyl)pyrimidine-5-yl-carboxylic acid chloride (0.68 g) in methylene chloride (30 ml).

Dimethylaminopyridine (0.05 g) in methylene chloride (5 ml) was added to the mixture obtained above, followed by stirring at room temperature for 24 hours. The reaction mixture was put in water and was rendered neutral and then, only the dichloromethane layer was extracted. This layer was dried over anhydrous magnesium sulfate and then, the solvent was distilled off. The residue was purified by column chromatography (developer: hexane/ethyl acetate=20/1) to obtain the titled compound (0.67 g). Optical rotation $a_D{}^{20} = +32.3°$.

Phase transition temperatures (° C) of the resulting compound were observed under a polarizing microscope using a hot stage.

Figure 4:
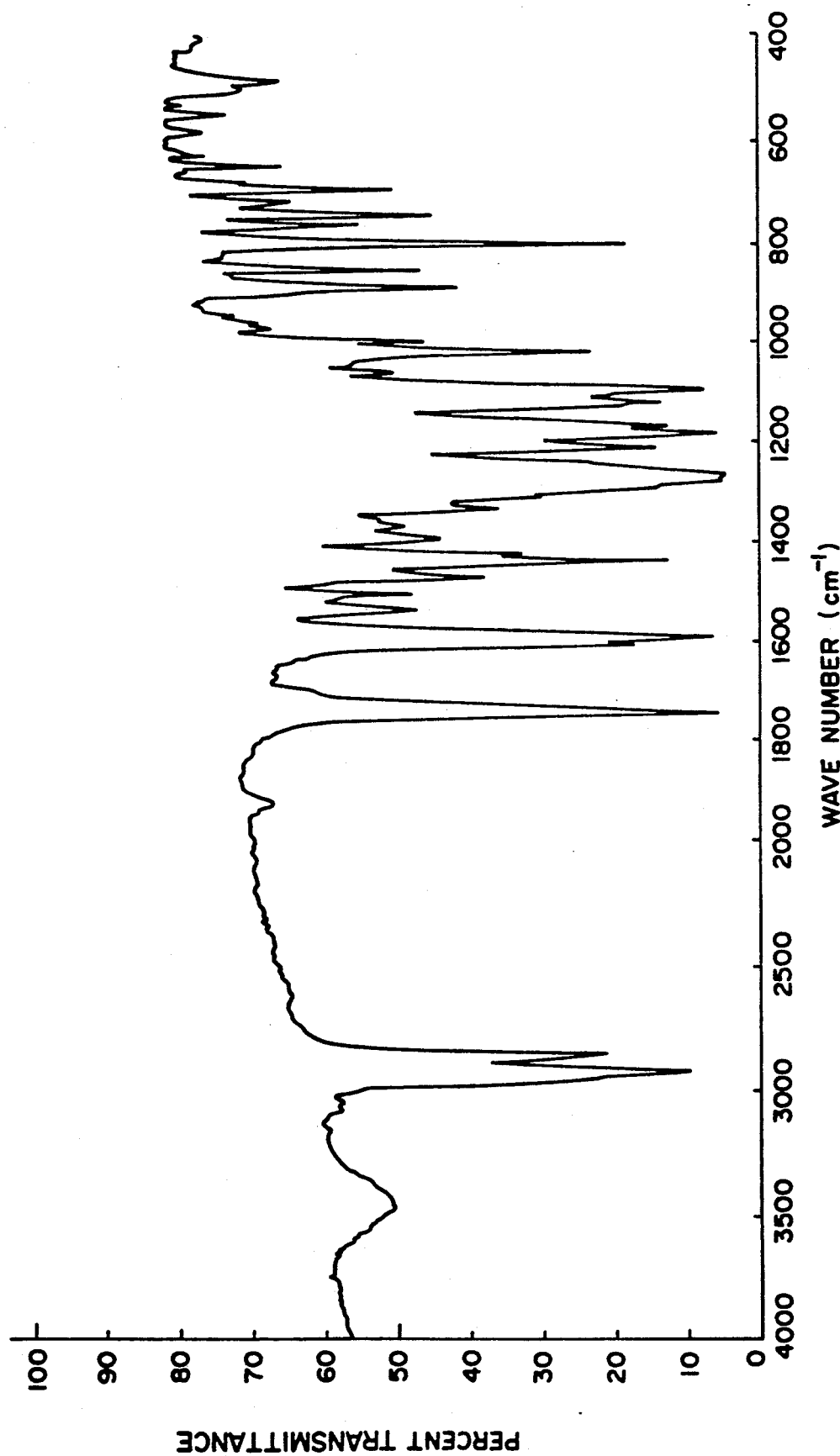
FIGS. 4-28 show IR spectra of the compounds of Examples 4-28, respectively.

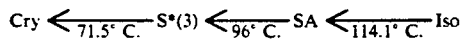

wherein S*(3) shows tristable state liquid crystal phase.
FIG. 4 is an IR spectrum of the titled compound.

EXAMPLE 5

(1) Preparation of 1,1,1-trifluoro-2-decyl 4-benzyloxybenzoate

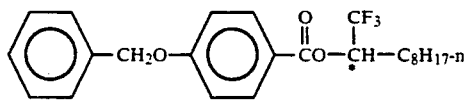

4-Benzyloxybenzoic acid chloride (1.23 g) was dissolved in methylene chloride (10 ml) and to the resulting solution was gradually added under ice cooling a solution of optically active 1,1,1-trifluoro-2-decanol (0.96 g), dimethylaminopyridine (0.55 g) and triethylamine (0.48 g) in methylene chloride (20 ml).

After the temperature of the reaction mixture was returned to room temperature, reaction was allowed to proceed for 24 hours and the resulting reaction mixture was poured into ice water and was extracted with methylene chloride. The methylene chloride layer was washed with dilute hydrochloric acid, water, 1N aqueous sodium carbonate solution and water in this order and dried over anhydrous magnesium sulfate and the solvent was distilled off to obtain a crude product. The product was subjected to toluene-silica gel column chromatography and was further recrystallized from ethanol to obtain the titled compound (1.84 g).

(2) Preparation of 1,1,1-trifluoro-2-decyl 4-hydroxybenzoate

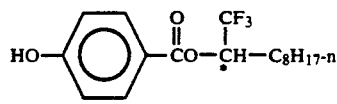

To a solution of the compound obtained in the above (1) in methanol (15 ml) was added 10% Pd carried on carbon (0.36 g) and the mixture was subjected to hydrogenolysis reaction under hydrogen atmosphere to obtain the titled compound (1.43 g).

(3) Preparation of 4-(1,1,1-trifluoro-2-decyloxycarbonyl)phenyl 2-(4-n-octyloxyphenyl)pyrimidine-5-ylcarboxylate 2-(4-n-octyloxyphenyl)pyrimidine-5-yl-carboxylate

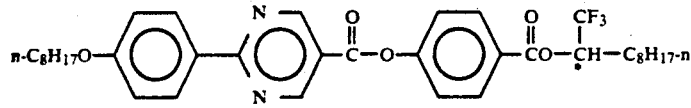

1,1,1-Trifluoro-2-decyl-4-hydroxybenzoate (0.50 g) prepared in the above (2) and triethylamine (0.15 g) were dissolved in methylene chloride (30 ml). Thereto was gradually added dropwise a solution of 2-(4-n-octyloxyphenyl)pyrimidine-5-yl-carboxylic acid chloride (0.63 g) in methylene chloride (30 ml).

Dimethylaminopyridine (0.05 g) in methylene chloride (5 ml) was added to the mixture obtained above, followed by stirring at room temperature for 24 hours. The reaction mixture was introduced into water and was made neutral and then, only the dichloromethane layer was extracted. This was dried over anhydrous magnesium sulfate and then, the solvent was distilled off. The residue was purified by column chromatography (developer: hexane/ethyl acetate =20/1) to obtain the titled product (0.59 g).

Optical rotation [α]$_{20}^D$=31 0°
Phase transition temperatures (° C) of the titled compound were observed under a polarizing microscope with a hot stage.

Figure 5:
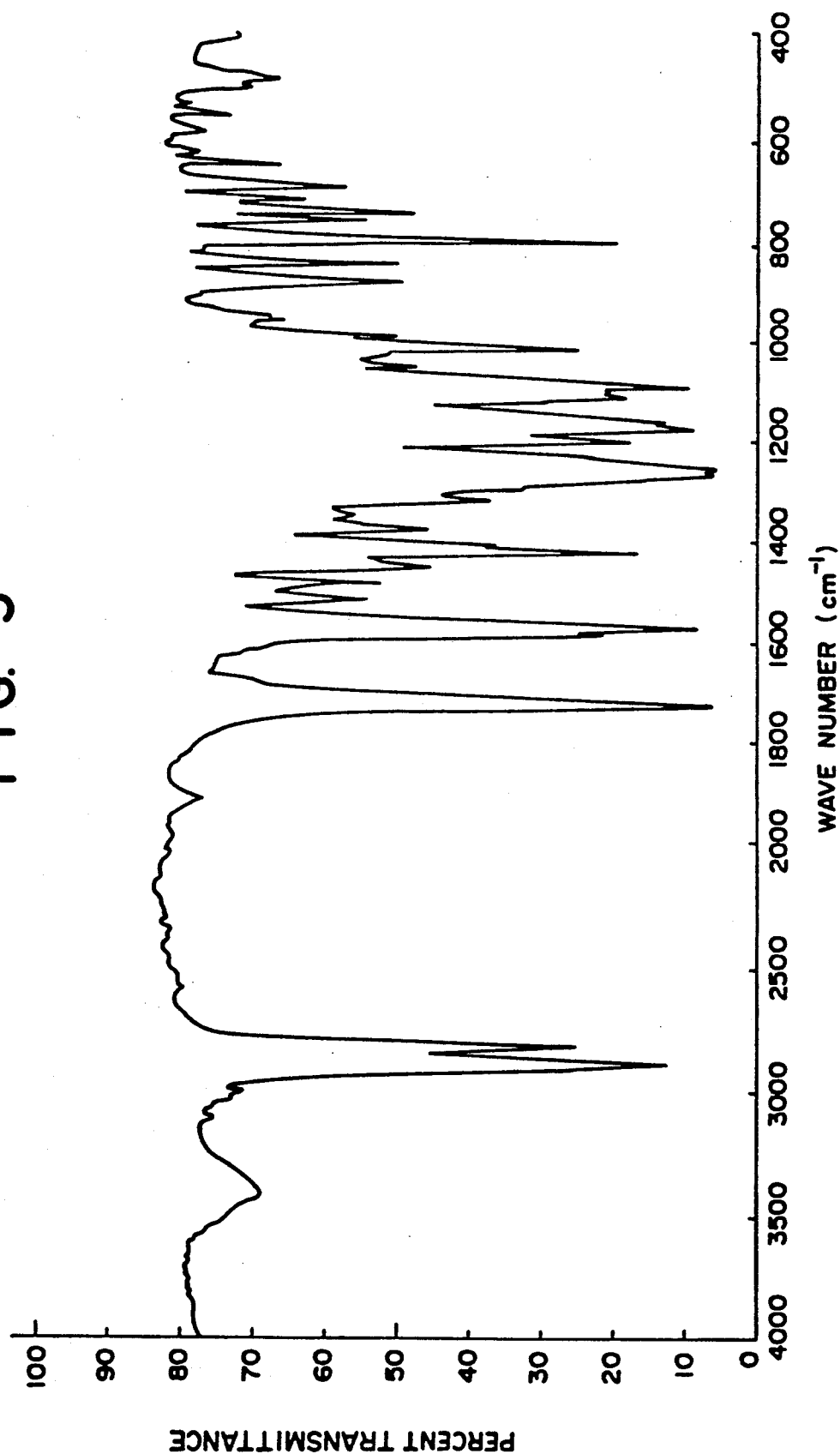

Cry <—65.4° C.— S*(3) <—84° C.— SA <—102.9° C.— Iso wherein S*(3) shows tristable state liquid crystal phase.
FIG. 5 is an IR spectrum of the titled compound.

EXAMPLE 6

Preparation of 3-fluoro-4-(1,1,1-trifluoro-2-octyloxycarbonyl)phenyl 2-(4-n-octyloxyphenyl)-pyrimidine-5-yl-carboxylate

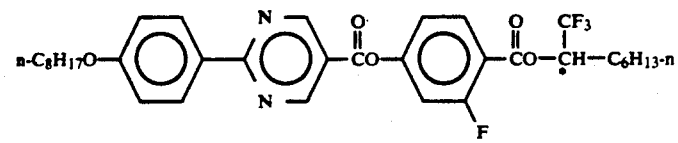

1,1,1-Trifluoro-2-octyl 3-fluoro-4-hydroxybenzoate (0.35 g) prepared in (2) of Example 1 and triethylamine (0.10 g) were dissolved in methylene chloride (30 ml) and thereto was gradually added dropwise a solution of 4-(5-n-octyloxy-2-pyrimidyl)benzoic acid chloride (0.41 g) in dichloromethane (30 ml). Furthermore, thereto was added dimethylaminopyridine (0.05 g), followed by stirring at room temperature for 24 hours. The reaction mixture was introduced into water and was made neutral and then, only the dichloromethane layer was extracted. This was dried over anhydrous magnesium sulfate and thereafter, the solvent was distilled off. The residue was purified by column chromatography (developer: hexane/ethyl acetate =20/1) to obtain the titled compound (0.40 g).

Optical rotation [α]$_D^{20}$=29.7°
Phase transition temperatures of the titled compound were observed under a polarizing microscope with a hot stage.

Figure 6:
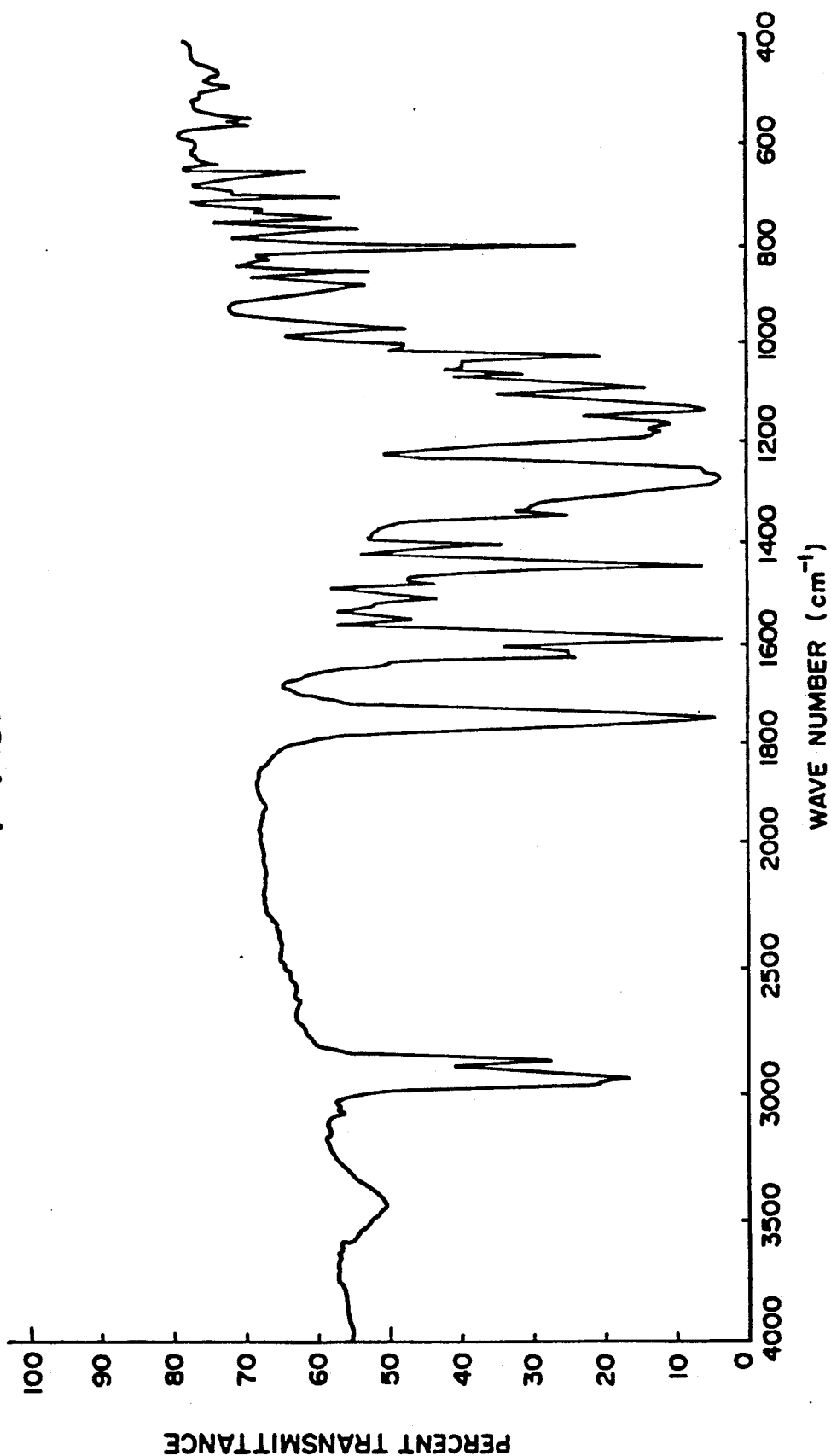

Cry <—51° C.— S*(3) <—103° C.— SA <—109.7° C.— Iso wherein S*(3) shows tristable state liquid crystal phase.
FIG. 6 is an IR spectrum of the titled compound.

EXAMPLE 7

Preparation of 2-fluoro-4-(1,1,1-trifluoro-2-octyloxycarbonyl)phenyl 4-(5-n-nonylpyrimidine-2-yl)benzoate

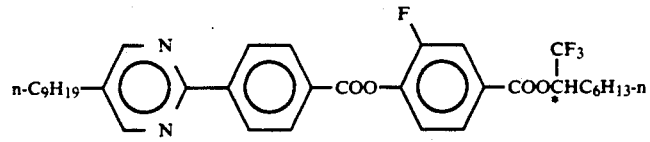

4-(5-n-Nonylpyrimidine-2-yl)benzoic acid (1.63 g) was heated together with excess thionyl chloride for 8 hours under reflux and thereafter, unaltered thionyl chloride was distilled off to obtain 4-(5-n-nonylpyrimidine-2-yl)benzoic acid chloride.

Then, optically active 1,1,1-trifluoro-2-octyl 2-fluoro-4-hydroxybenzoate (1.62 g) and triethylamine (1.52 g) were dissolved in methylene chloride (20 ml) and thereto was gradually added dropwise a solution of the above prepared 4-(5-n-nonylpyrimidine-2-yl)benzoic acid chloride in methylene chloride (20 ml), followed by stirring at room temperature for 24 hours. Then, the reaction mixture was poured in water and was made neutral, and thereafter the methylene chloride layer was extracted. This was dried over anhydrous magnesium sulfate and the solvent was distilled off.

The residue was purified by silica gel column chromatography and recrystallization to obtain the titled compound (2.1 g).

Optical rotation $[\alpha]^{20}_D 30.00°$
(c=2.100 CHCl₃)

Figure 7:
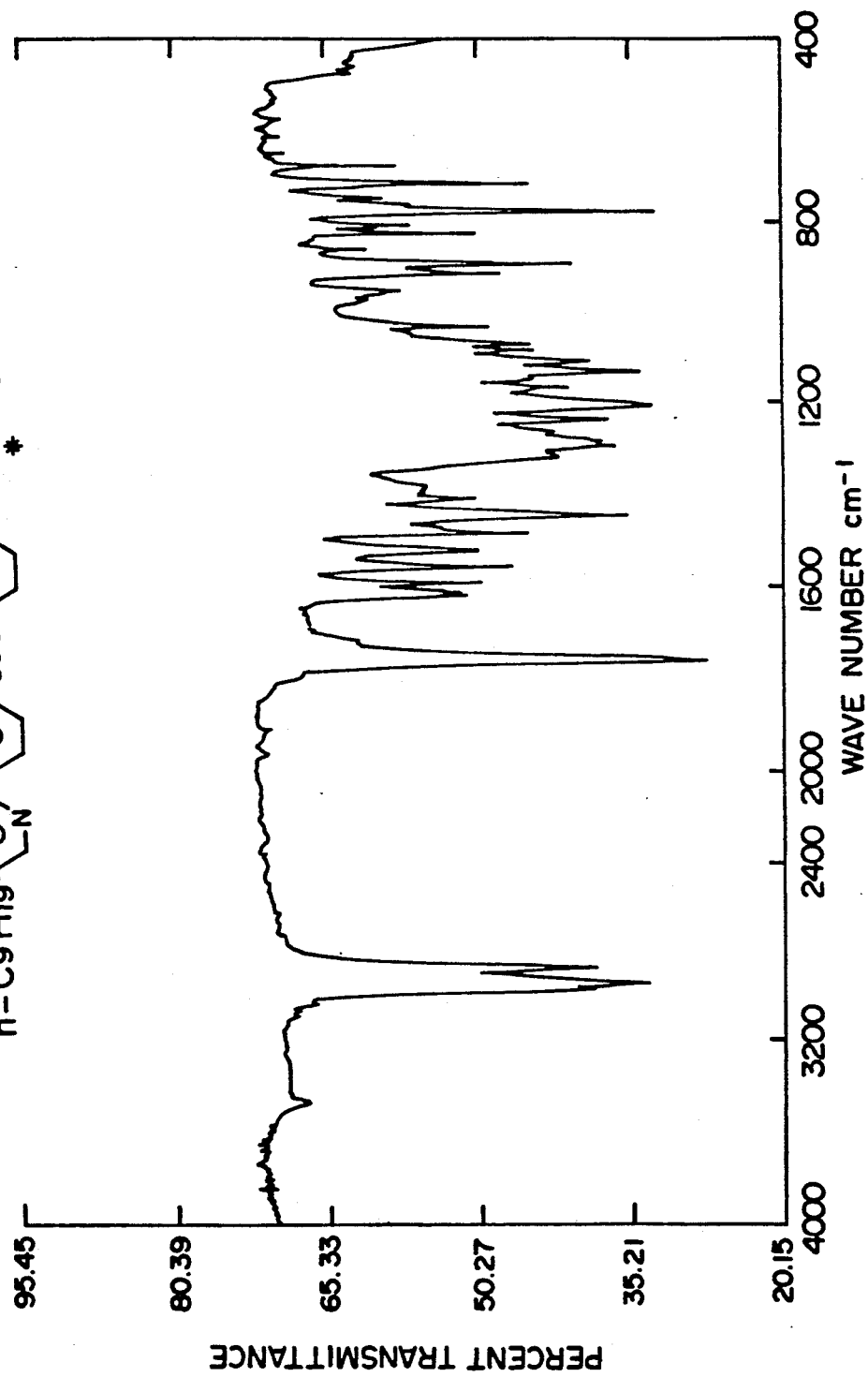

IR spectrum (KBr): FIG. 7

Phase transition temperatures (° C) of the titled compound were observed under polarizing microscope with a hot stage.

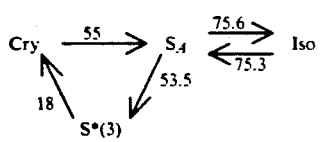

where S*(3) shows optically tristable state liquid crystal phase.

EXAMPLE 8

Preparation of
2-fluoro-4-(1,1,1-trifluoro-2-decyloxycarbonyl)phenyl 4-(5-n-nonylpyrimidine-2-yl)benzoate

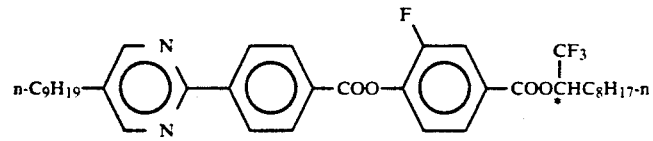

4-(5-n-Nonylpyrimidine-2-yl)benzoic acid (1.63 g) was heated together with excess thionyl chloride for 8 hours under reflux and thereafter, unaltered thionyl chloride was distilled off to obtain 4-(5-n-nonylpyrimidine-2-yl)benzoic acid chloride.

Then, optically active 1,1,1-trifluoro-2-decyl 2-fluoro-4-hydroxybenzoate (1.75 g) and triethylamine (1.52 g) were dissolved in methylene chloride (20 ml) and thereto was gradually added dropwise a solution of the above prepared 4-(5-n-nonylpyrimidine-2-yl)benzoic acid chloride in methylene chloride (20 ml), followed by stirring at room temperature for 24 hours. Then, the reaction mixture was poured in water and was made neutral, and thereafter, only the methylene chloride layer was extracted. This was dried over anhydrous magnesium sulfate and the solvent was distilled off.

The residue was purified by silica gel column chromatography and recrystallization to obtain the titled compound (2.2 g).

Optical rotation $[\alpha]_D^{20}= +29.66°$
(c=2.110 CHCl₃)

Figure 8:
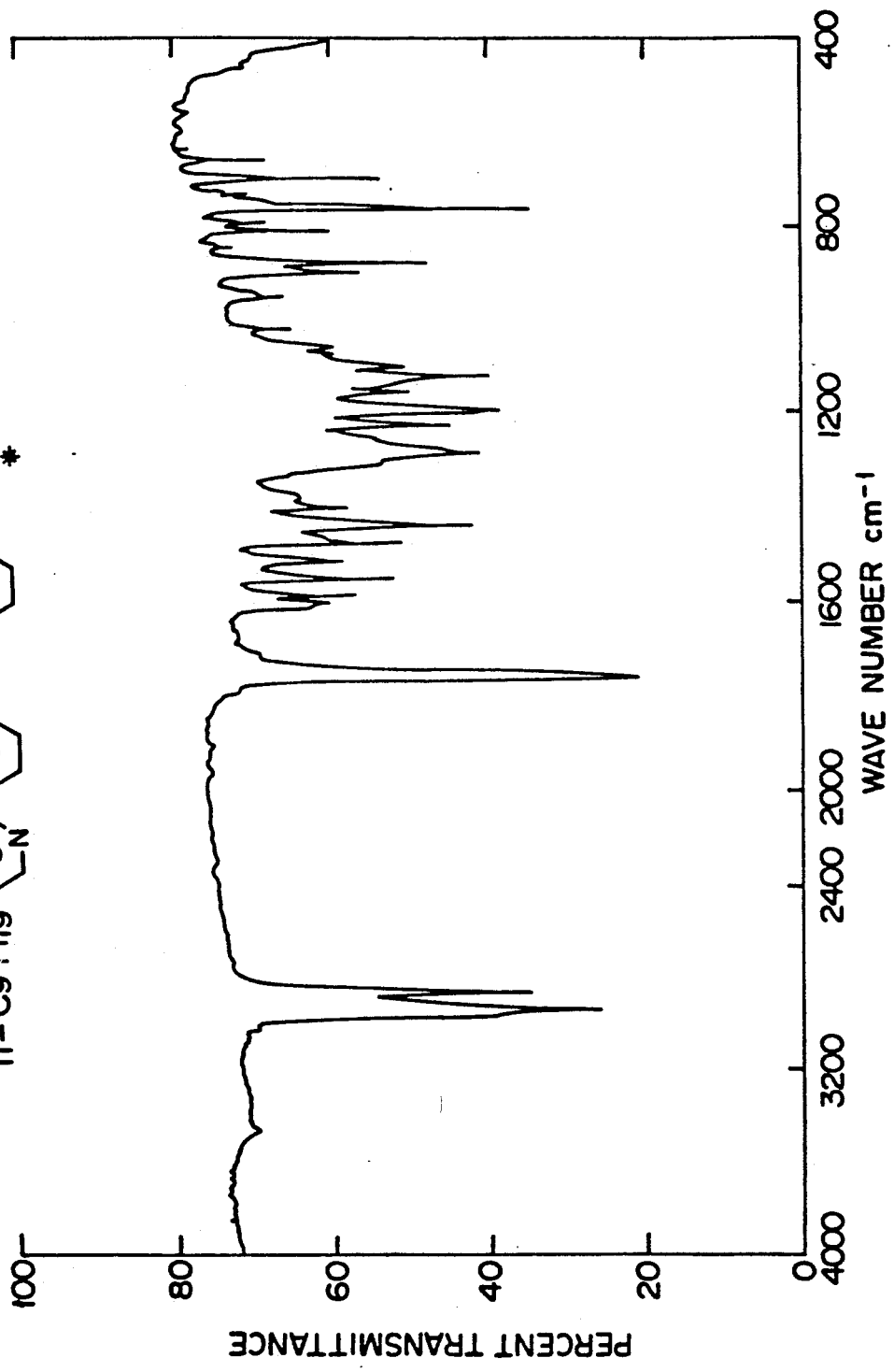

IR spectrum (KBr): FIG. 8

Phase transition temperatures (° C) of the titled compound were observed under a polarizing microscope with a hot stage.

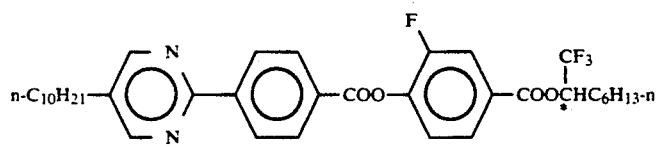

where S*(3) shows optically tristable state liquid crystal phase.

EXAMPLE 9

Preparation of
2-fluoro-4-(1,1,1-trifluoro-2-octyloxycarbonyl)phenyl 4-(5-n-decylpyrimidine-2-yl)benzoate 4-(5-n-Decylpyrimidine-2-yl)benzoic acid (1.80 g) was heated together with excess thionyl chloride for 8 hours under reflux and thereafter, unaltered thionyl chloride was distilled off to obtain 4-(5-n-decylpyrimidine-2-yl)benzoic acid chloride.

Then, optically active 1,1,1-trifluoro-2-octyl 2-fluoro-4-hydroxybenzoate (1.71 g) and triethylamine (1.61 g) were dissolved in methylene chloride (20 ml) and to the solution was gradually added dropwise a solution of the above prepared 4-(5-n-decylpyrimidine-2-yl)benzoic acid chloride in methylene chloride (20 ml), followed by stirring at room temperature for 24 hours. The reaction mixture was poured in water and was made neutral, and thereafter, only the methylene chloride layer was extracted. This was dried over anhydrous magnesium sulfate and the solvent was distilled off.

The residue was purified by silica gel column chromatography and recrystallization to obtain the titled compound (2.0 g).

Optical rotation $[\alpha]_D^{20}= +29.49°$
(c ™ 0.600 CHCl₃)

Figure 9:
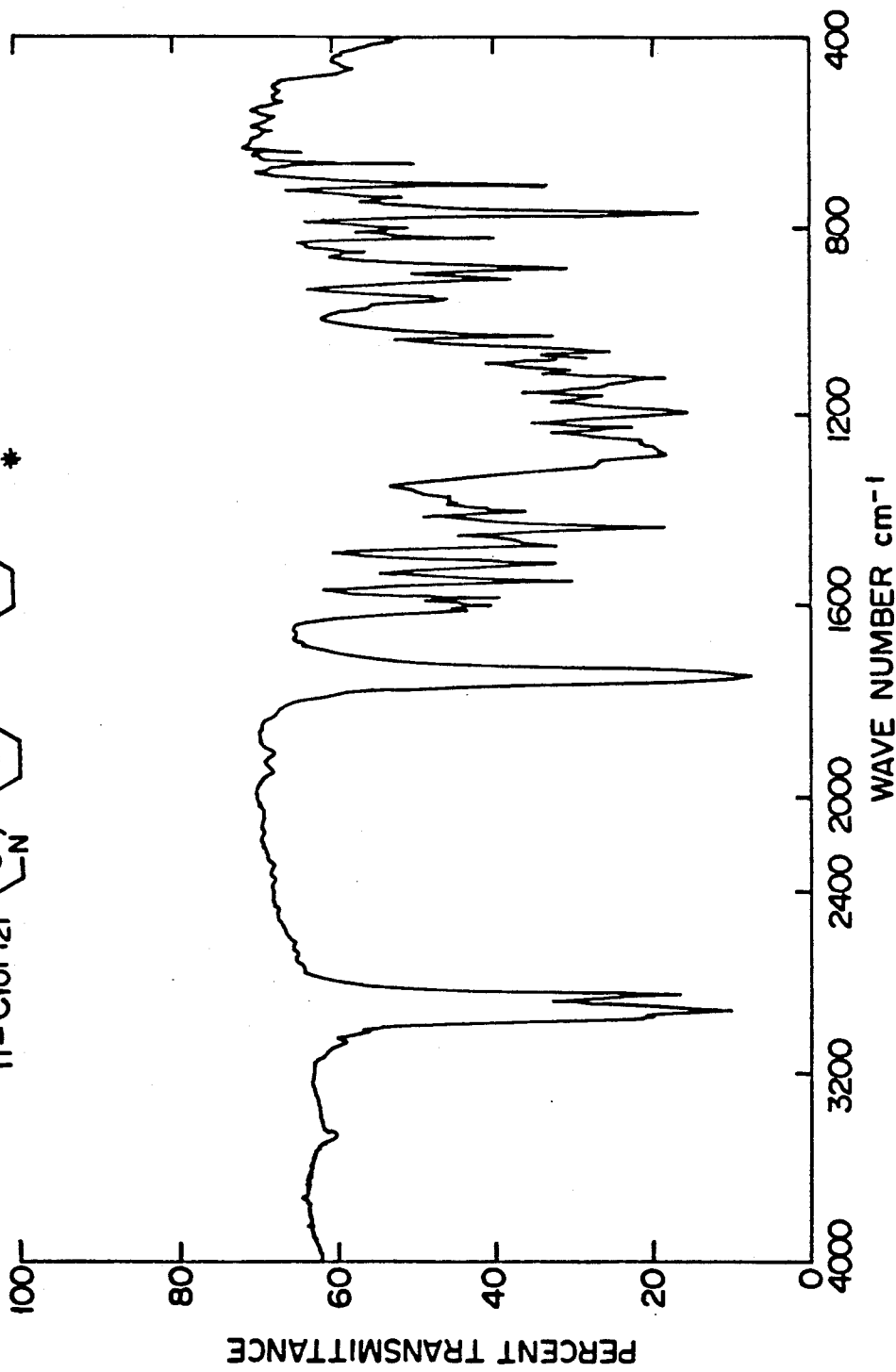

IR spectrum (KBr): FIG. 9

Phase transition temperatures (° C) of the titled compound were observed under a polarizing microscope with a hot stage.

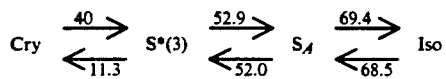

where S*(3) shows optically tristable state liquid crystal phase.

EXAMPLE 10

Preparation of
2-fluoro-4-(1,1,1-trifluoro-2-decyloxycarbonyl)phenyl 4-(5-n-decylpyrimidine-2yl)

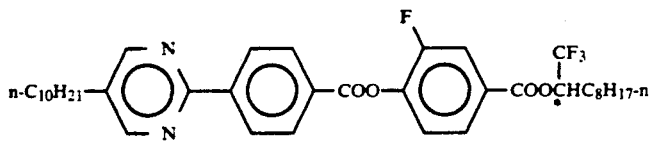

4-(5-n-Decylpyrimidine-2-yl)benzoic acid (1.77 g) was heated together with excess thionyl chloride for 8 hours under reflux and thereafter, unaltered thionyl chloride was distilled off to obtain 4-(5-n-decylpyrimidine-2-yl)benzoic acid chloride.

Then, optically active 1,1,1-trifluoro-2decyl 2-fluoro-4-hydroxybenzoate (1.82 g) and triethylamine (1.58 g) were dissolved in methylene chloride (20 ml) and to the solution was gradually added dropwise a solution of the above prepared 4-(5-n-decylpyrimidine-2-yl)benzoic acid chloride in methylene chloride (20 ml), followed by stirring at room temperature for 24 hours. The reaction mixture was poured in water and was made neutral, and thereafter, only the methylene chloride layer was extracted. This was dried over anhydrous magnesium sulfate and the solvent was distilled off.

The residue was purified by silica gel column chromatography and recrystallization to obtain the titled compound (1.4 g).

Optical rotation $[\alpha]^{20}_D = +28.75°$
(c = 1.370 CHCl$_3$)

Figure 10:
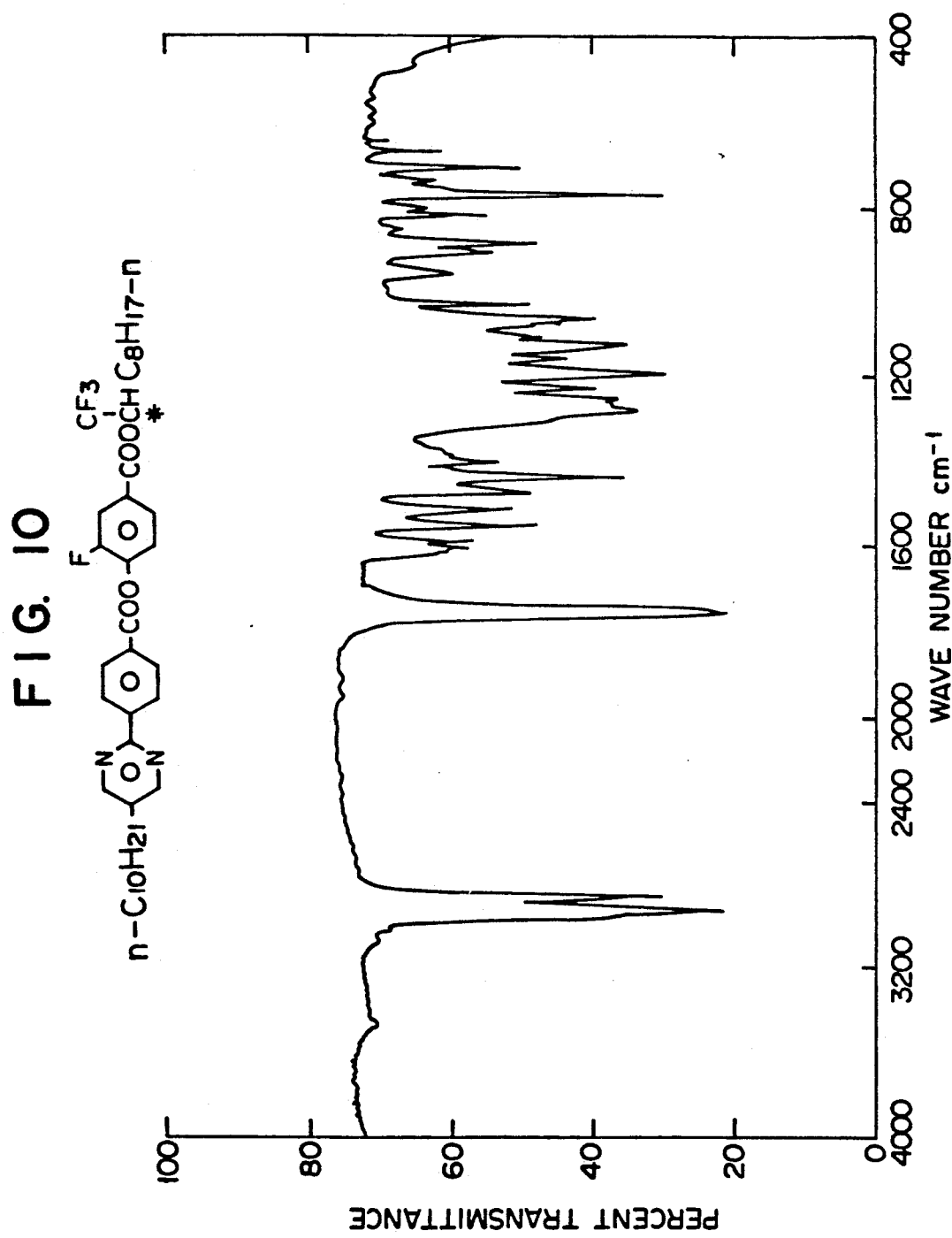

IR spectrum (KBr): FIG. 10

Phase transition temperatures (° C) of the titled compound were observed under a polarizing microscope with a hot stage.

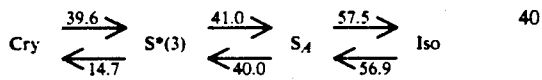

where S*(3) shows optically tristable state liquid crystal phase.

EXAMPLE 11

Preparation of
2-fluoro-4-(1,1,1-trifluoro-2-octyloxycarbonyl)phenyl 4-(5-n-undecylpyrimidine-2-yl)benzoate

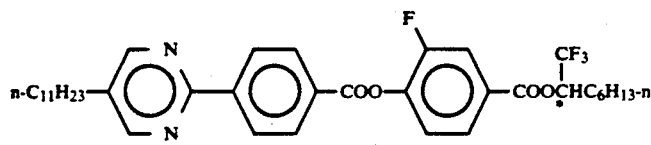

4-(5-n-Undecylpyrimidine-2-yl)benzoic acid (1.70 g) was heated together with excess thionyl chloride for 8 hours under reflux and thereafter, unaltered thionyl chloride was distilled off to obtain 4-(5-n-undecyl-pyrimidine-2-yl)benzoic acid chloride.

Then, optically active 1,1,1-trifluoro-2-octyl 2-fluoro-4-hydroxybenzoate (1.54 g) and triethylamine (1.45 g) were dissolved in chloroform (20 ml) and to the resulting solution was gradually added dropwise a solution of the above prepared 4-(5-n-decylpyrimidine-2-yl)benzoic acid chloride in chloroform (10 ml), followed by stirring at room temperature for 24 hours. The reaction mixture was poured in water and was made neutral, and thereafter, only the chloroform layer was extracted. This was dried over anhydrous magnesium sulfate and the solvent was distilled off.

The residue was purified by silica gel column chromatography and recrystallization to obtain the titled compound (2.2 g).

Optical rotation $[\alpha]^{20}_D = +28.85°$
(c = 2.000 CHCl$_3$)

Figure 11:
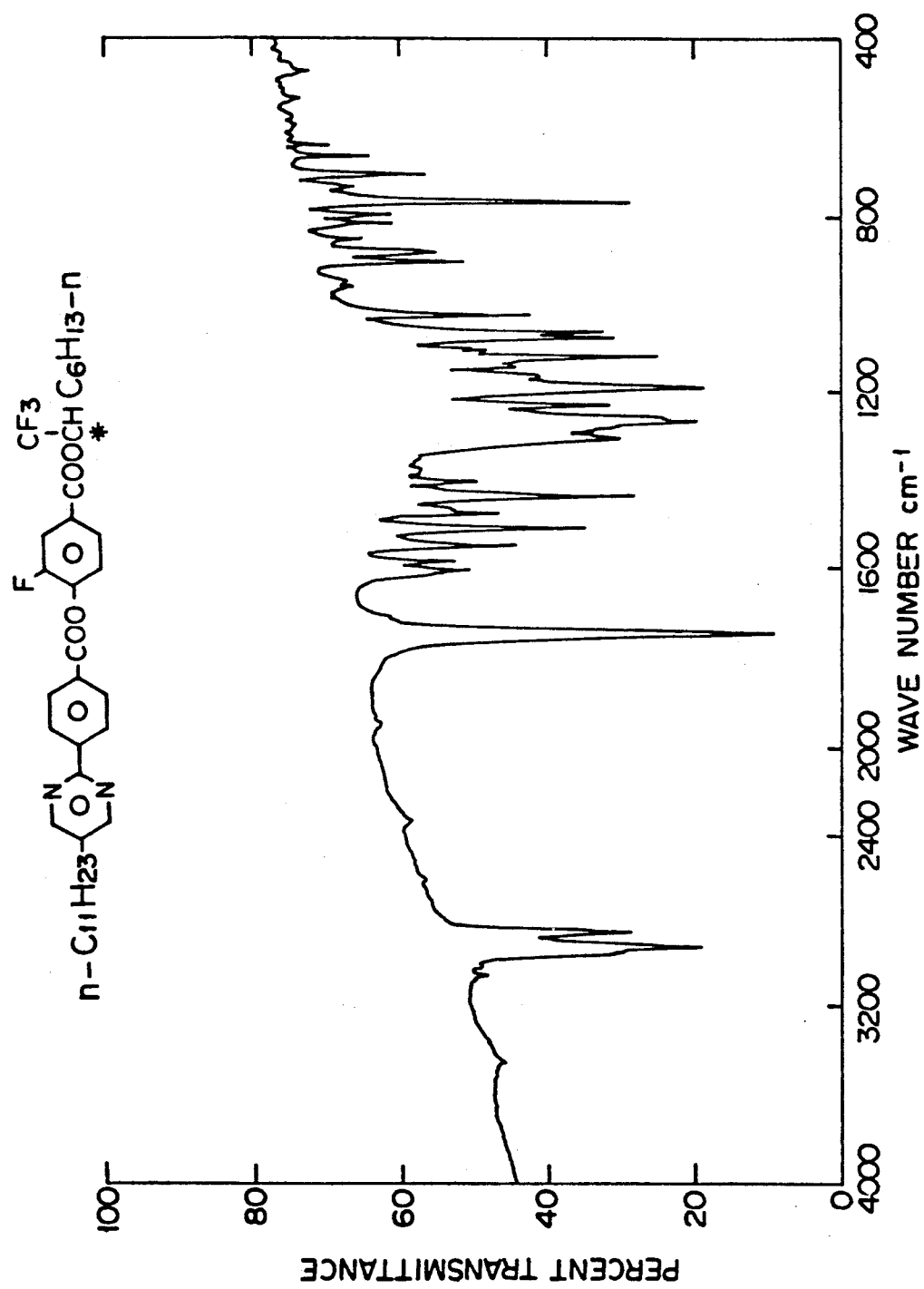

IR spectrum (KBr): FIG. 11

Phase transition temperatures (° C) of the titled compound were observed under a polarizing microscope with a hot stage.

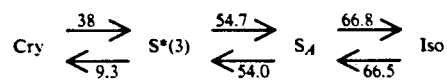

where S*(3) shows optically tristable state liquid crystal phase.

EXAMPLE 12

Preparation of
2-fluoro-4-(1,1,1-trifluoro-2-decyloxycarbonyl)phenyl 4-(5-n-undecylpyrimidine-2-yl)benzoate

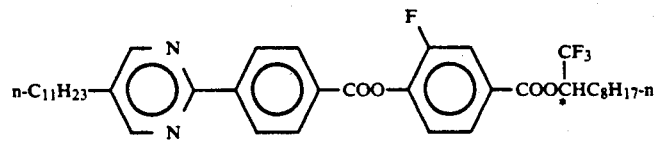

4-(5-n-Undecylpyrimidine-2-yl)benzoic acid (1.70 g) was heated together with excess thionyl chloride for 8 hours under reflux and thereafter, unaltered thionyl chloride was distilled off to obtain 4-(5-n-undecyl-pyrimidine-2-yl)benzoic acid chloride.

Then, optically active 1,1,1-trifluoro-2-decyl 2-fluoro-4-hydroxybenzoate (1.68 g) and triethylamine (1.45 g) were dissolved in chloroform (20 ml) and to the resulting solution was gradually added dropwise a solution of the above prepared 4-(5-n-undecylpyrimidine-2- yl)benzoic acid chloride in chloroform (10 ml). followed by stirring at room temperature for 24 hours. The reaction mixture was poured in water and was made neutral, and thereafter, the chloroform layer was extracted. This was dried over anhydrous magnesium sulfate and the solvent was distilled off.

The residue was purified by silica gel column chromatography and recrystallization to obtain the titled compound (2.8 g).

Figure 12:
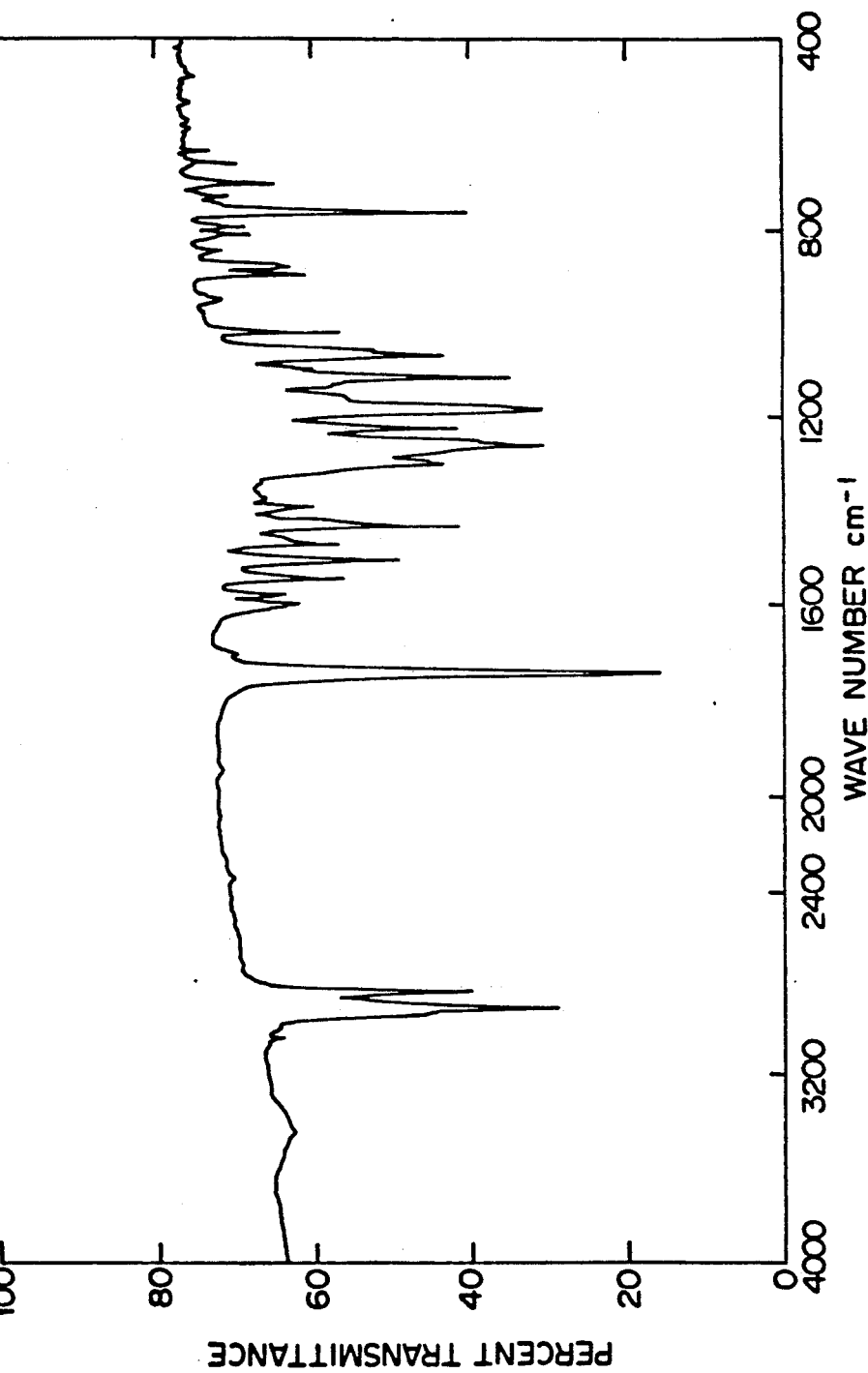

Optical rotation $[\alpha]^{20}_D = +30.32°$
(c=2.015 CHCl$_3$)
IR spectrum (KBr): FIG. 12

Phase transition temperatures (° C) of the titled compound were observed under a polarizing microscope with a hot stage.

Phase transition temperatures (° C) of the titled compound were observed under a polarizing microscope with a hot stage

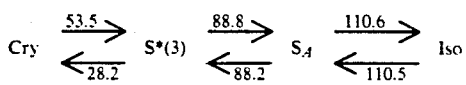

where S*(3) shows optically tristable state liquid crystal phase.

EXAMPLE 14

Preparation of 2-fluoro-4-(1,1,1-trifluoro2-decyloxycarbonyl)phenyl 4-(5-n-nonyloxypyrimidine-2yl)benzoate

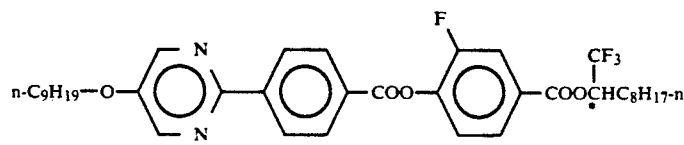

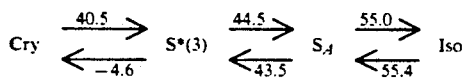

where S*(3) shows optically tristable state liquid crystal phase.

EXAMPLE 13

Preparation of 2-fluoro-4-(1,1,1-trifluoro2-octyloxycarbonyl)phenyl 4-(5-n-nonyloxypyrimidine-2-yl)benzoate

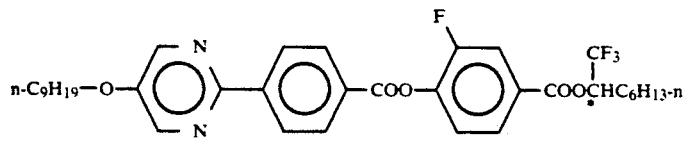

4-(5-n-Nonyloxylpyrimidine-2-yl)benzoic acid (1.88 g) was heated together with excess thionyl chloride for 8 hours under reflux and thereafter, unaltered thionyl chloride was distilled off to obtain 4-(5-n-nonyloxypyrimidine-2-yl)benzoic acid chloride.

Then, optically active 1,1,1-trifluoro-2-octyl 2-fluoro-4-hydroxybenzoate (1.78 g) and triethylamine (1.67 g) were dissolved in methylene chloride (20 ml) and to the resulting solution was gradually added dropwise a solution of the above prepared 4-(5-n-nonyloxypyrimidine-2-yl)benzoic acid chloride in methylene chloroform (20 ml). followed by stirring at room temperature for 24 hours. The reaction mixture was poured in water and was made neutral, and thereafter the methylene chloride layer was extracted. This was dried over anhydrous magnesium sulfate and the solvent was distilled off.

The residue was purified by silica gel column chromatography and recrystallization to obtain the titled compound (2.8 g).

Figure 13:
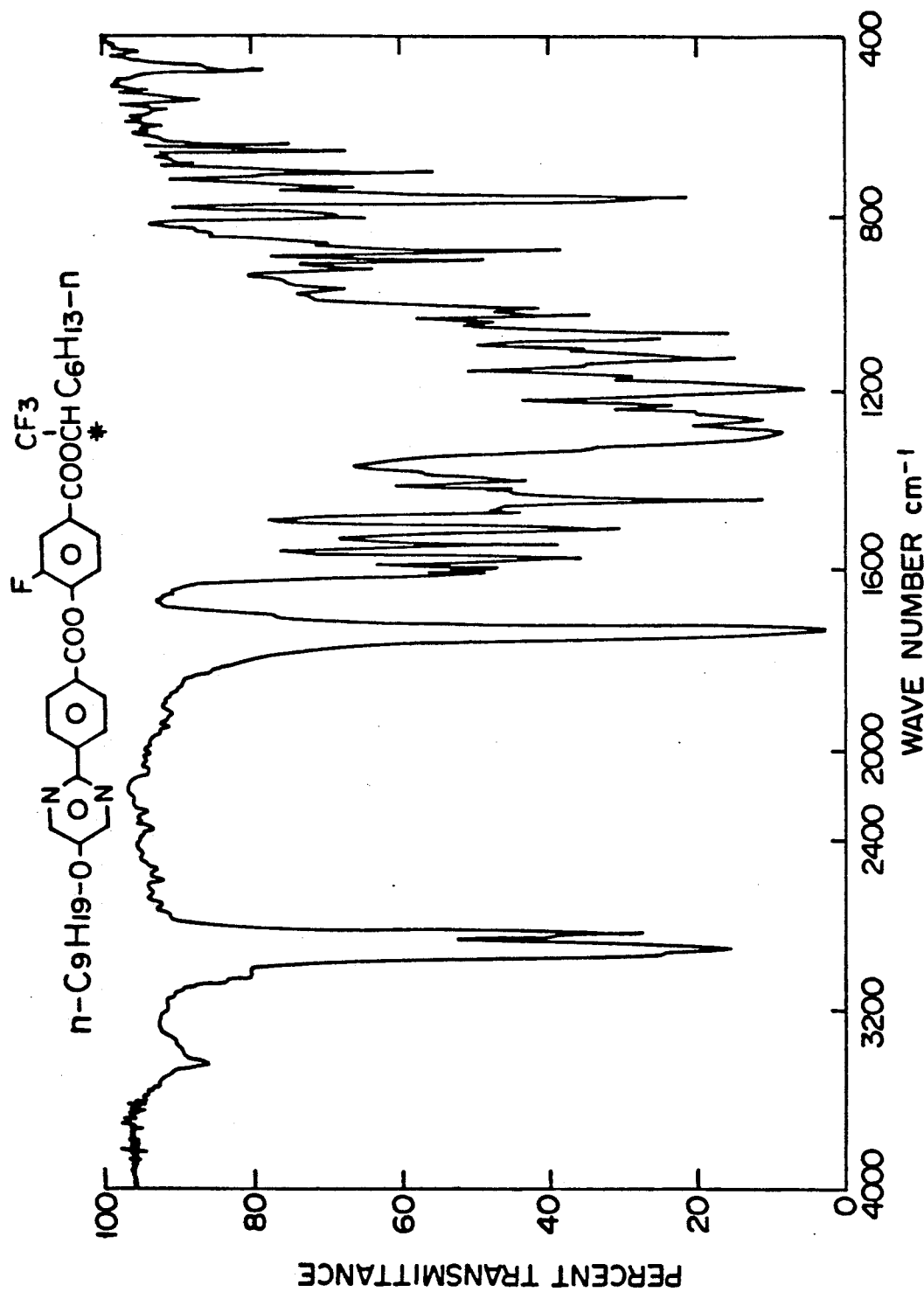

Optical rotation $[\alpha]^{20}_D = +29.64°$
(c=2.415 CHCl$_3$)
IR spectrum (KBr): FIG. 13

4-(5-n-Nonyloxylpyrimidine-2-yl)benzoic acid (1.78 g) was heated together with excess thionyl chloride for 8 hours under reflux and thereafter, unaltered thionyl chloride was distilled off to obtain 4-(5-n-nonyloxypyrimidine-2-yl)benzoic acid chloride.

Then, optically active 1,1,1-trifluoro-2-decyl 2-fluoro-4-hydroxybenzoate (1.82 g) and triethylamine (1.58 g) were dissolved in methylene chloride (20 ml) and to the resulting solution was gradually added dropwise a solution of the above prepared 4-(5-n-nonyloxypyrimidine-2-yl)benzoic acid chloride in methylene chloride (20 ml), followed by stirring at room temperature for 24 hours. The reaction mixture was poured in water and was made neutral, and thereafter the methylene chloride layer was extracted. This was dried over anhydrous magnesium sulfate and the solvent was distilled off.

The residue was purified by silica gel column chromatography and recrystallization to obtain the titled compound (3.0 g).

Figure 14:
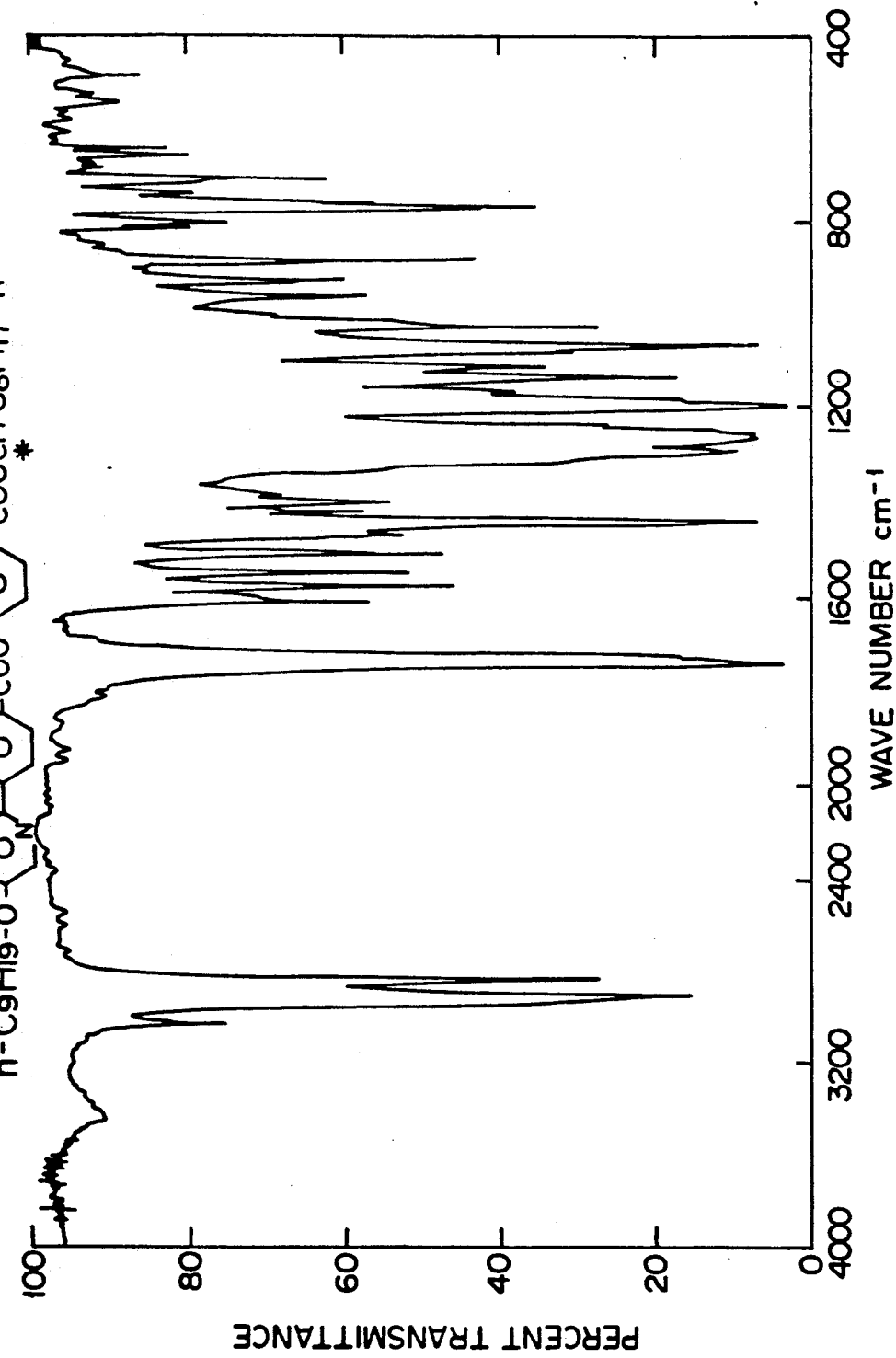

Optical rotation $[\alpha]^{20}_D = +29.75°$
(c=2.080 CHCl$_3$)
IR spectrum (KBr): FIG. 14

Phase transition temperatures (° C) of the titled compound were observed under a polarizing microscope with a hot stage.

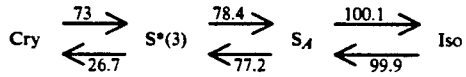

where S*(3) shows optically tristable state liquid crystal phase.

EXAMPLE 15

Preparation of 2-fluoro-4-(1,1,1-trifluoro-2-octyloxycarbonyl)phenyl 4-(5-n-decyloxypyrimidine-2-yl)benzoate

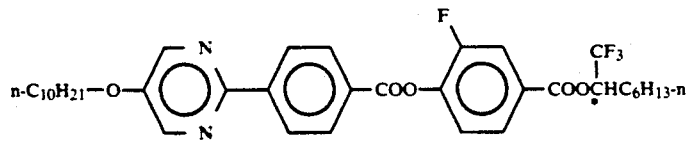

4-(5-n-Decyloxypyrimidine-2-yl)benzoic acid (1.50 g) was heated together with excess thionyl chloride for 8 hours under reflux and thereafter, unaltered thionyl chloride was distilled off to obtain 4-(5-n-decyloxypyrimidine-2-yl)benzoic acid chloride.

Then, optically active 1,1,1-trifluoro-2-octyl 2-fluoro-4-hydroxybenzoate (1.35 g) and triethylamine (1.27 g) were dissolved in methylene chloride (15 ml) and to the resulting solution was gradually added dropwise a solution of the above prepared 4-(5-n-decyloxypyrimidine-2-yl)benzoic acid chloride in chloroform (10 ml), followed by stirring at room temperature for 24 hours. The reaction mixture was poured in water and was made neutral, and thereafter the chloroform layer was extracted. This was dried over anhydrous magnesium sulfate and the solvent was distilled off.

The residue was purified by silica gel column chromatography and recrystallization to obtain the titled compound (1.1 g).

Optical rotation $[\alpha]_D^{20} = +29.52°$
(c = 2.005 CHCl$_3$)

Figure 15:
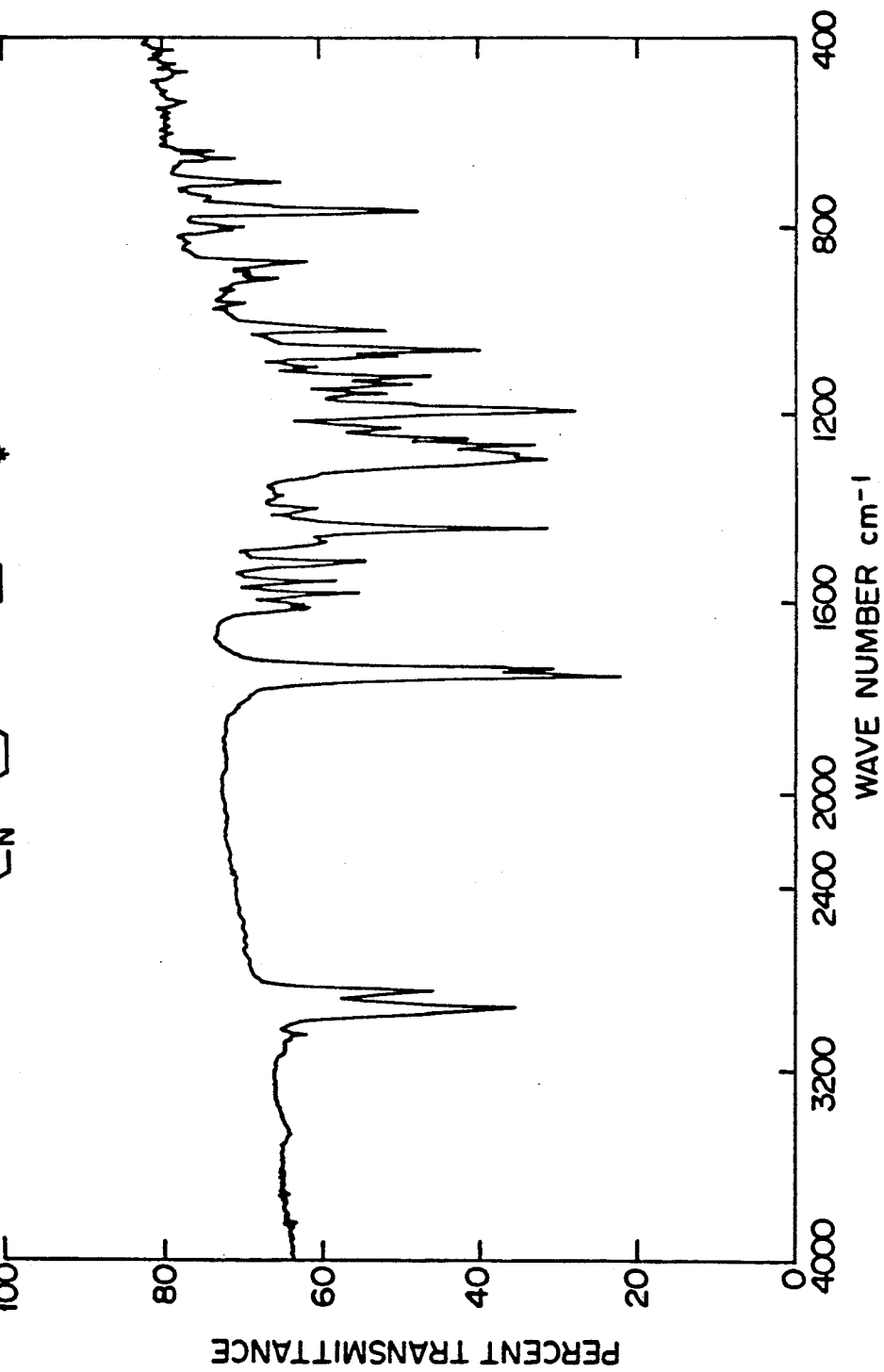

IR spectrum (KBr): FIG. 15

Phase transition temperatures (° C) of the titled compound were observed under a polarizing microscope with a hot stage.

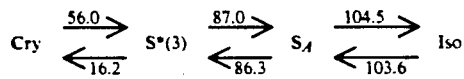

where S*(3) shows optically tristable state liquid crystal phase.

EXAMPLE 16

Preparation of 2-fluoro-4-(1,1,1-trifluoro-2-decyloxycarbonyl)phenyl 4-(5-n-decyloxypyrimidine-2-yl)benzoate

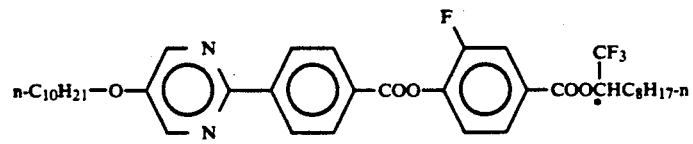

4-(5-n-Decyloxypyrimidine-2-yl)benzoic acid (1.50 g) was heated together with excess thionyl chloride for 8 hours under reflux and thereafter, unaltered thionyl chloride was distilled off to obtain 4-(5-n-decyloxypyrimidine-2-yl)benzoic acid chloride.

Then, optically active 1,1,1-trifluoro-2-decyl 2-fluoro-4-hydroxybenzoate (1.47 g) and triethylamine (1.27 g) were dissolved in chloroform (15 ml) and to the resulting solution was gradually added dropwise a solution of the above prepared 4-(5-n-decyloxypyrimidine-2-yl)benzoic acid chloride in chloroform (10 ml), followed by stirring at room temperature for 24 hours. The reaction mixture was poured in water and was made neutral, and thereafter the chloroform layer was extracted. This was dried over anhydrous magnesium sulfate and the solvent was distilled off.

The residue was purified by silica gel column chromatography and recrystallization to obtain the titled compound (2.1 g).

Optical rotation $[\alpha]_D^{20} = +28.55°$
(c = 2.000 CHCl$_3$)

Figure 16:
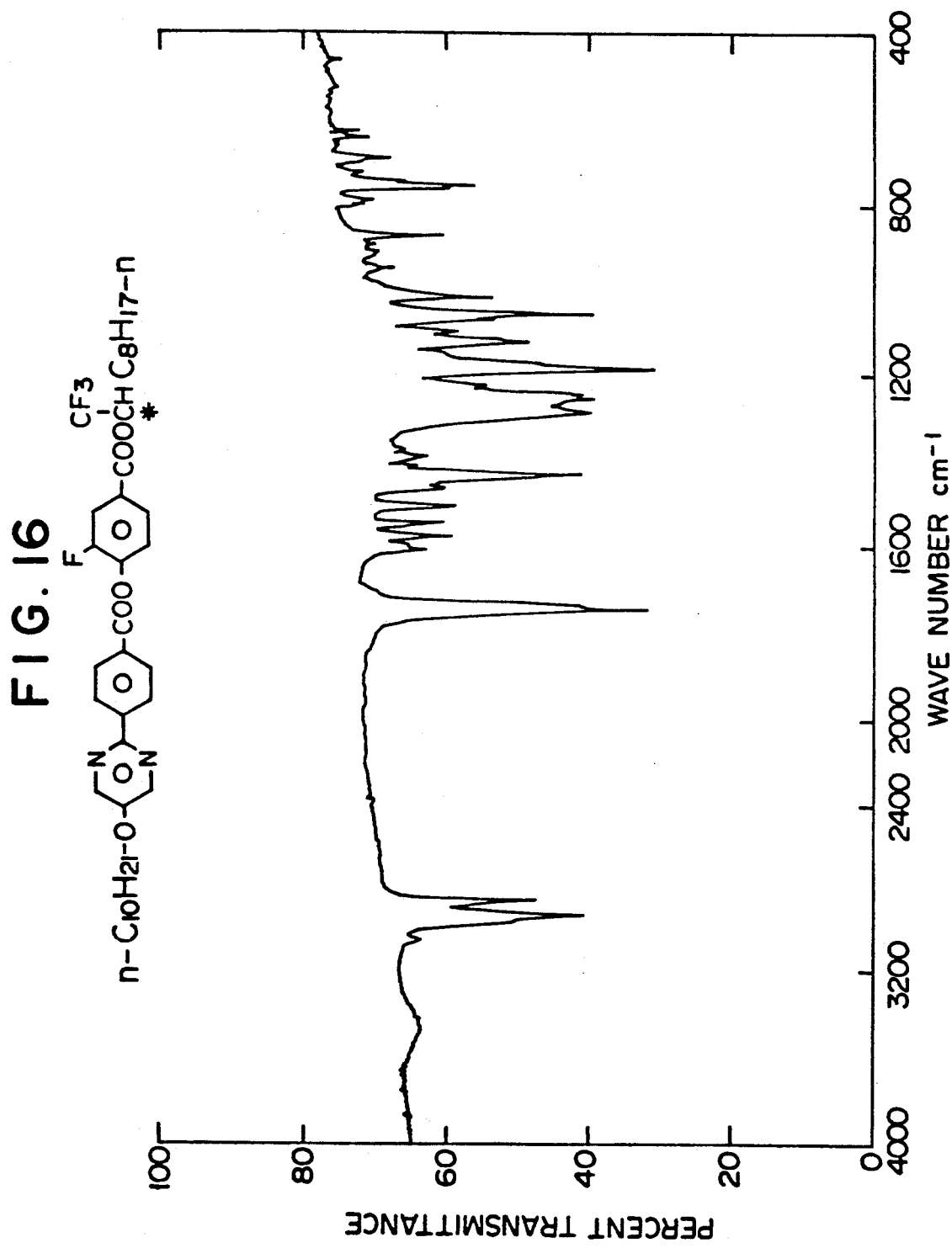

IR spectrum (KBr): FIG. 16

Phase transition temperatures (° C) of the titled compound were observed under a polarizing microscope with a hot stage,

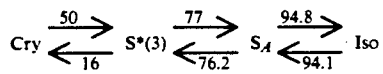

where S*(3) shows optically tristable state liquid crystal phase.

EXAMPLE 17

Preparation of 2-fluoro-4-(1,1,1-trifluoro-2-octyloxycarbonyl)phenyl 4-(5-n-undecyloxypyrimidine-2-yl)benzoate

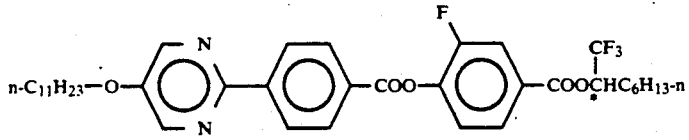

4-(5-n-Undecyloxypyrimidine-2-yl)benzoic acid (1.86 g) was heated together with excess thionyl chloride for 8 hours under reflux and thereafter, unaltered thionyl chloride was distilled off to obtain 4-(5-n-undecyloxypyrimidine-2-yl)benzoic acid chloride.

Then, optically active 1,1,1-trifluoro-2-octyl 2-fluoro-4-hydroxybenzoate (1.62 g) and triethylamine (1.52 g) were dissolved in methylene chloride (20 ml) and to the resulting solution was gradually added dropwise a solution of the above prepared 4-(5-n-undecyloxypyrimidine-2-yl)benzoic acid chloride in methylene chloride (20 ml), followed by stirring at room temperature for 24 hours. The reaction mixture was poured in water and was made neutral, and thereafter the methylene chloride layer was extracted. This was dried over anhydrous magnesium sulfate and the solvent was distilled off.

The residue was purified by silica gel column chromatography and recrystallization to obtain the titled compound (2.6 g).

Figure 17:
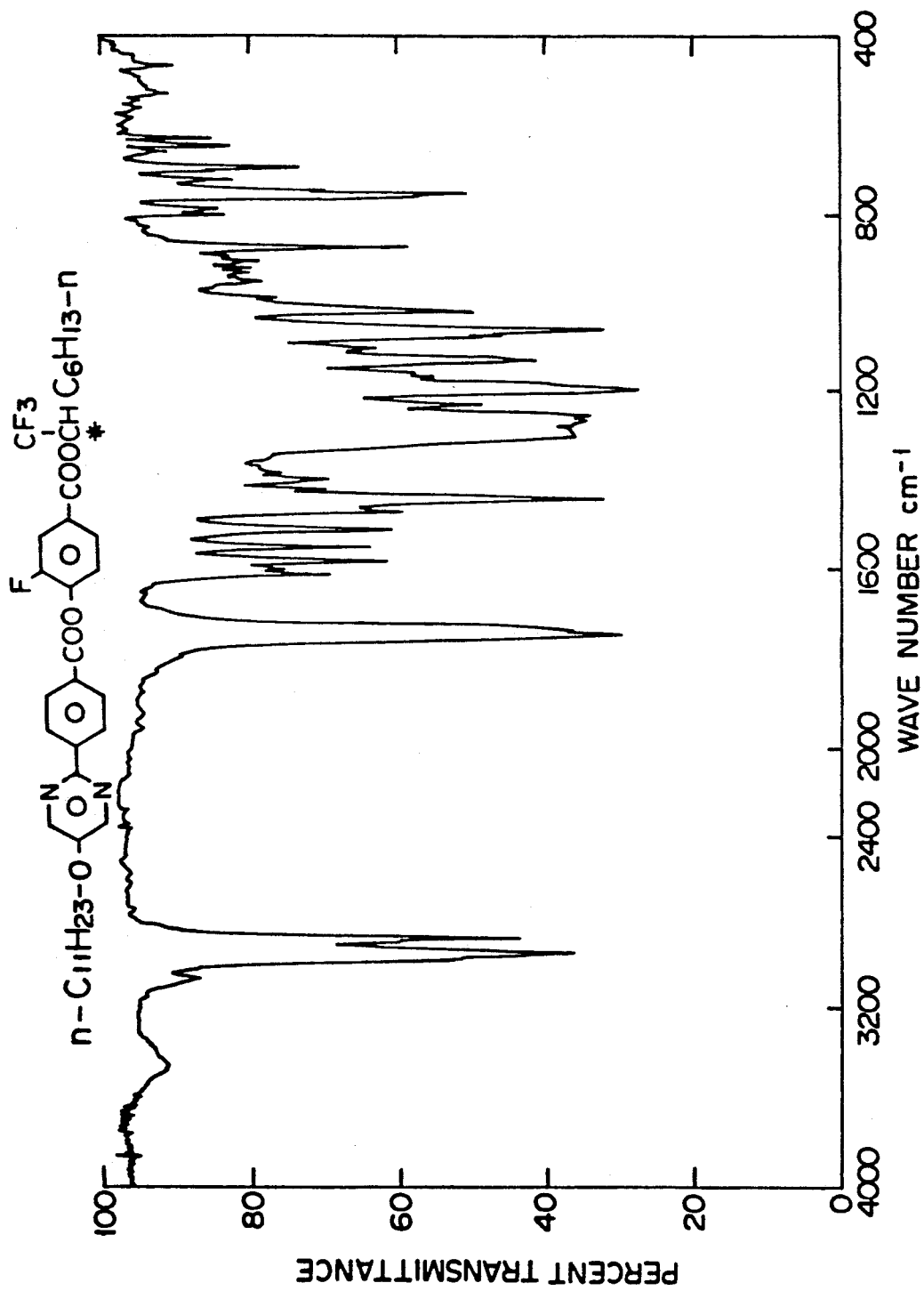

Optical rotation $[\alpha]^{20}_D = +27.97°$
(c = 1.995 CHCl$_3$)
IR spectrum (KBr): FIG. 17

Phase transition temperatures (° C) of the titled compound were observed under a polarizing microscope with a hot stage.

Figure 18:
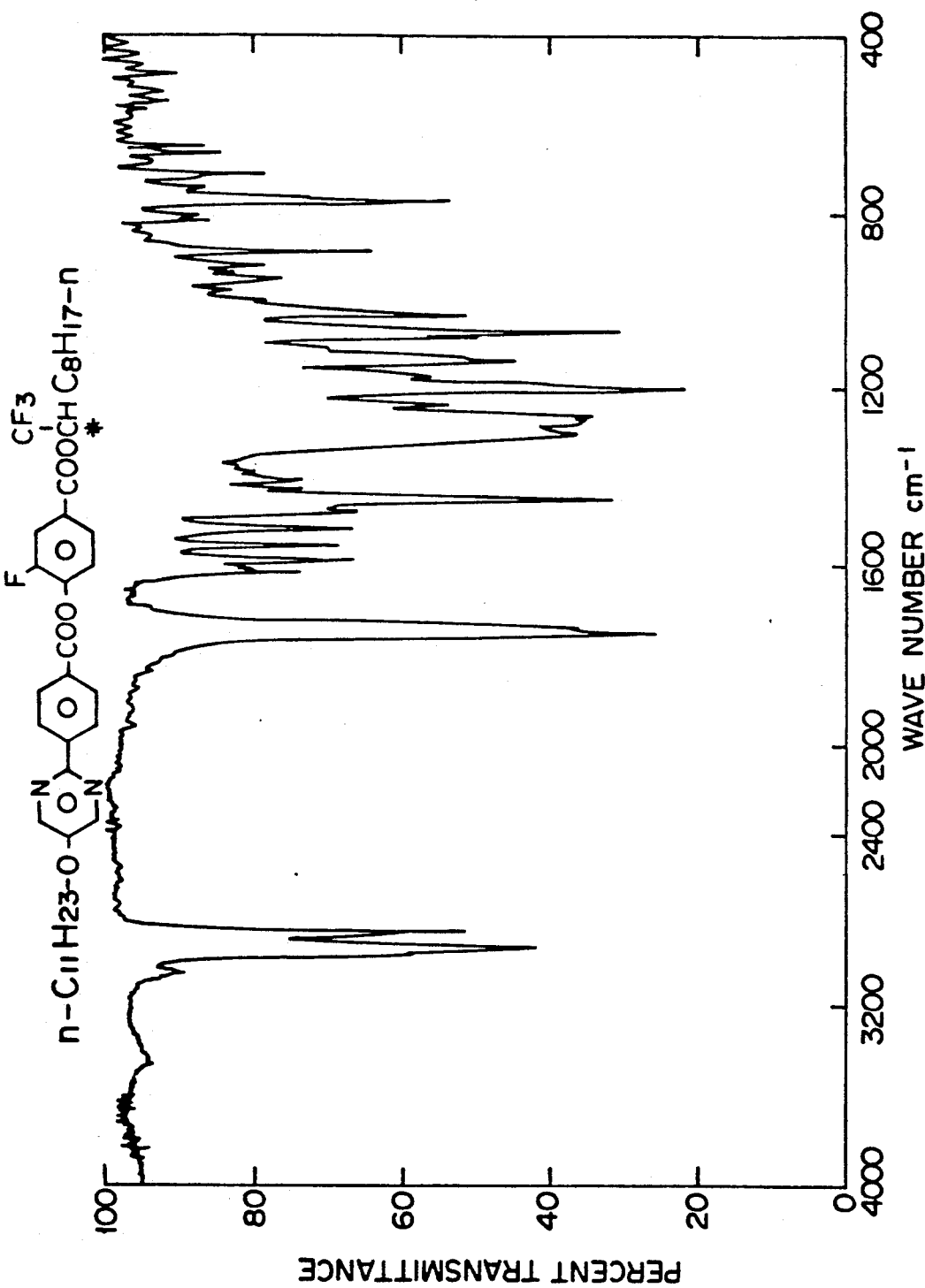

IR spectrum (KBr): FIG. 18

Phase transition temperatures (° C) of the titled compound were observed under a polarizing microscope with a hot stage.

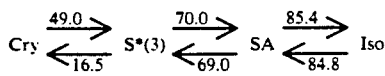

where S*(3) shows optically tristable state liquid crystal phase.

EXAMPLE 19

Preparation of 2-fluoro-4-(1,1,1-trifluoro-2-octyloxycarbonyl)-phenyl [3-fluoro-4-(5-n-octylpyrimidine-2-yl)]benzoate

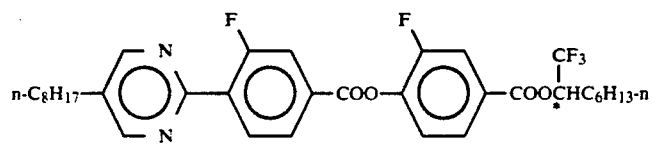

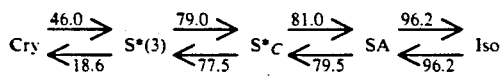

where S*(3) shows optically tristable state liquid crystal phase.

EXAMPLE 18

Preparation of 2-fluoro-4-(1,1,1-trifluoro-2-decyloxycarbonyl)phenyl 4-(5-n-undecyloxypyrimidine-2-yl)benzoate 3-Fluoro-4-(5-n-octylpyrimidine-2-yl)benzoic acid (1.66 g) was heated together with excess thionyl chloride for 8 hours under reflux and thereafter, unaltered thionyl chloride was distilled off to obtain 3-fluoro-4-(5-n-octylpyrimidine-2-yl)benzoic acid chloride.

Then, optically active 1,1,1-trifluoro-2-octyl 2-fluoro-4-hydroxybenzoate (1.62 g) and triethylamine (1.52 g) were dissolved in chloroform (20 ml) and to the resulting solution was gradually added dropwise a solution of the above prepared 3-fluoro-4-(5-n-octylpyrimidine-2-yl)benzoic acid chloride in chloroform (20 ml),

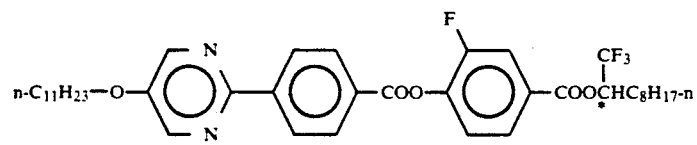

4-(5-n-Undecyloxypyrimidine-2-yl)benzoic acid (1.86 g) was heated together with excess thionyl chloride for 8 hours under reflux and thereafter, unaltered thionyl chloride was distilled off to obtain 4-(5-n-undecyloxypyrimidine-2-yl)benzoic acid chloride.

Then, optically active 1,1,1-trifluoro-2-decyl 2-fluoro-4-hydroxybenzoate (1.75 g) and triethylamine (1.52 g) were dissolved in methylene chloride (20 ml) and to the resulting solution was gradually added dropwise a solution of the above prepared 4-(5-n-undecyloxypyrimidine-2-yl)benzoic acid chloride in methylene chloride (2 ml), followed by stirring at room temperature for 24 hours. The reaction mixture was poured in water and was made neutral, and thereafter the methylene chloride layer was extracted. This was dried over anhydrous magnesium sulfate and the solvent was distilled off.

The residue was purified by silica gel column chromatography and recrystallization to obtain the titled compound (2.9 g).

Optical rotation $[\alpha]^{20}_D = +27.68°$
(c = 1.985 CHCl$_3$)

followed by stirring at room temperature for 24 hours.

The reaction mixture was poured in water and was made neutral, and then the chloroform layer was extracted. This was dried over anhydrous magnesium sulfate and the solvent was distilled off. The residue was purified by silica gel column chromatography and recrystallization to obtain the tited compound (2.1 g).

Figure 19:
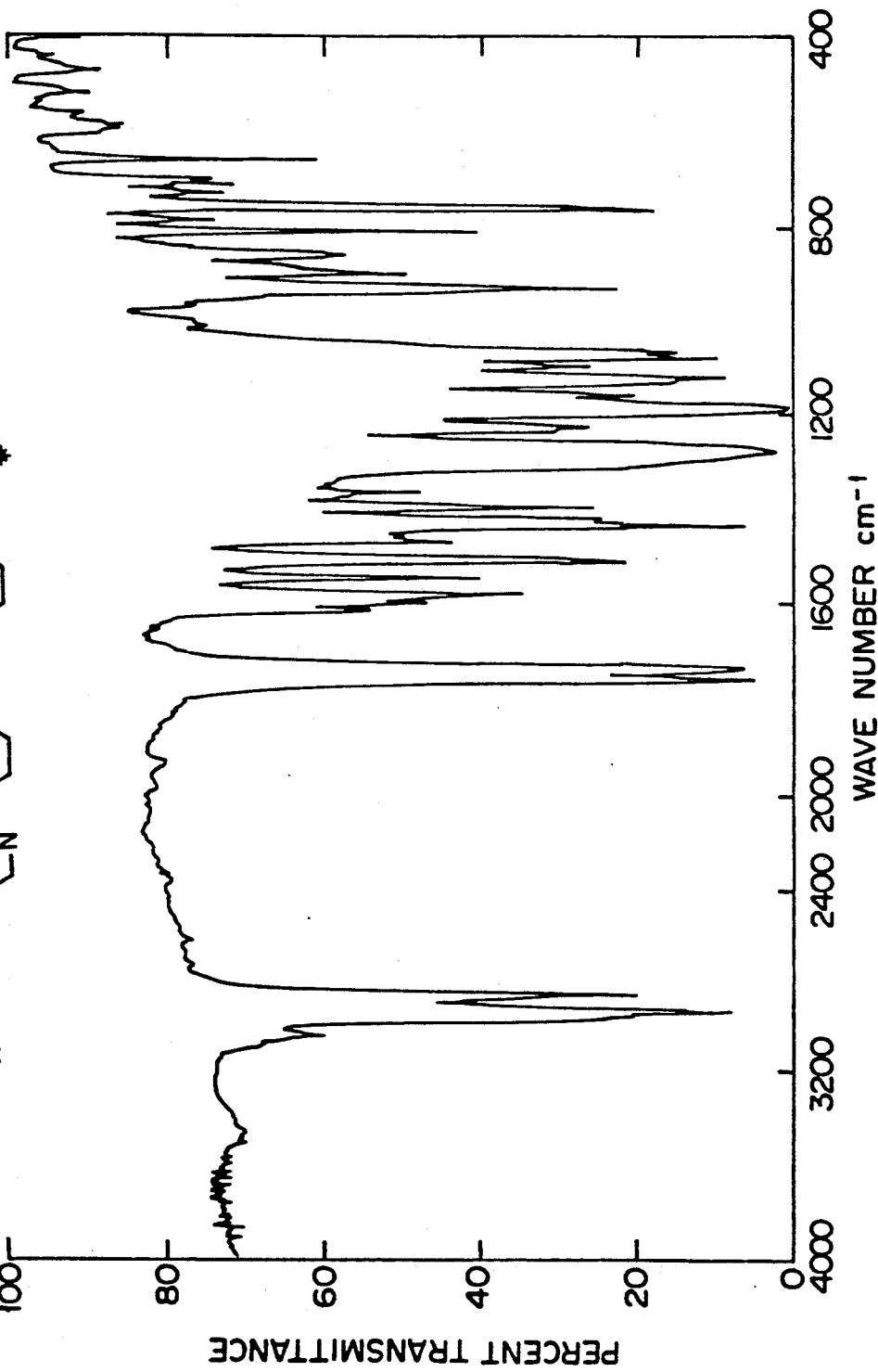

Optical rotation $[\alpha]^{20}_D = 28.91°$
(c = 1.240 CHCl$_3$)
IR spectrum (KBr): FIG. 19

Phase transition temperatures (° C) of the titled compound observed under a polarizing microscope with a hot stage were as follows:

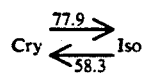

EXAMPLE 20

Preparation of 2-fluoro-4-(1,1,1-trifluoro-2-decyloxycarbonyl)-phenyl [3-fluoro-4-(5-n-octylpyrimidine-2-yl)]benzoate

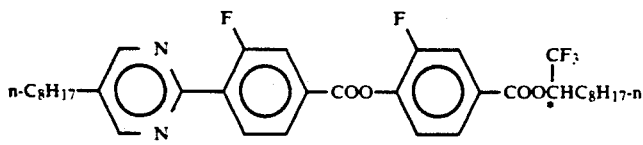

3-Fluoro-4-(5-n-octylpyrimidine-2-yl)benzoic acid (1.66 g) was heated together with excess thionyl chloride for 8 hours under reflux and thereafter, unaltered thionyl chloride was distilled off to obtain 3-fluoro-4-(5-n-octylpyrimidine-2-yl)benzoic acid chloride.

Then, optically active 1,1,1-trifluoro-2-decyl decyl 2-fluoro-4-hydroxybenzoate (1.75 g) and triethylamine (1.52 g) were dissolved in chloroform (20 ml) and to the resulting solution was gradually added dropwise a solution of the above prepared 3-fluoro-4-(5-n-octylpyrimidine-2-yl)benzoic acid chloride in chloroform (20 ml), followed by stirring at room temperature for 24 hours.

The reaction mixture was poured in water and was made neutral, and then the chloroform layer was extracted. This was dried over anhydrous magnesium sulfate and the solvent was distilled off. The residue was purified by silica gel column chromatography and recrystallization to obtain the titled compound (1.2 g).

Figure 20:
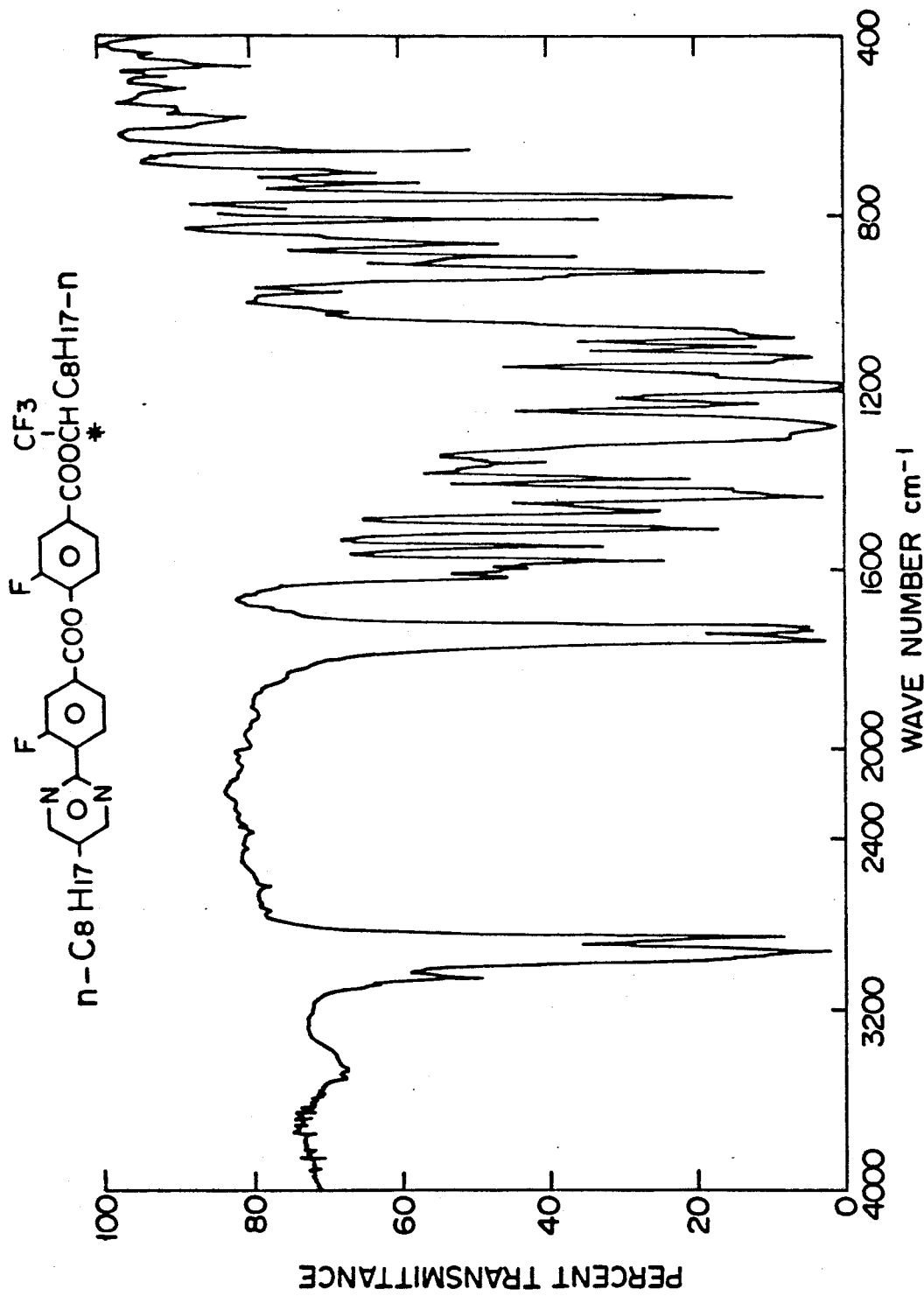

Optical rotation $[\alpha]^{20}_D = 29.35°$
(c = 1.175 CHCl$_3$)
IR spectrum (KBr): FIG. 20
Phase transition temperatures (° C) of the titled compound observed under a polarizing microscope with a hot stage were as follows:

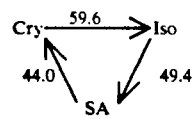

EXAMPLE 21

Preparation of 4-(1,1,1-trifluoro-2-decyloxycarbonyl)-phenyl [3-fluoro-4-(5-n-octylpyrimidine-2-yl)]benzoate

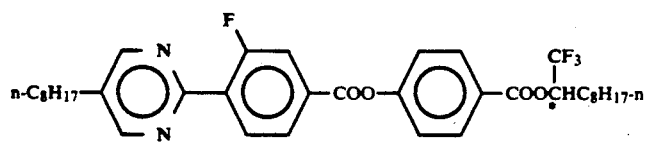

3-Fluoro-4-(5-n-octylpyrimidine-2-yl)benzoic acid (1.66 g) was heated together with excess thionyl chloride for 8 hours under reflux and thereafter, unaltered thionyl chloride was distilled off to obtain 3-fluoro-4-(5-n-octylpyrimidine-2-yl)benzoic acid chloride.

Then, optically active 1,1,1-trifluoro-2-decyl 4-hydroxybenzoate (1.67 g) and triethylamine (1.52 g) were dissolved in chloroform (20 ml) and to the resulting solution was gradually added dropwise a solution of the above prepared 3-fluoro-4-(5-n-octylpyrimidine-2-yl)benzoic acid chloride in chloroform (20 ml), followed by stirring at room temperature for 24 hours.

The reaction mixture was poured in water and was made neutral, and then the chloroform layer was extracted. This was dried over anhydrous magnesium sulfate and the solvent was distilled off. The residue was purified by silica gel column chromatography and recrystallization to obtain the titled compound (1.7 g).

Figure 21:
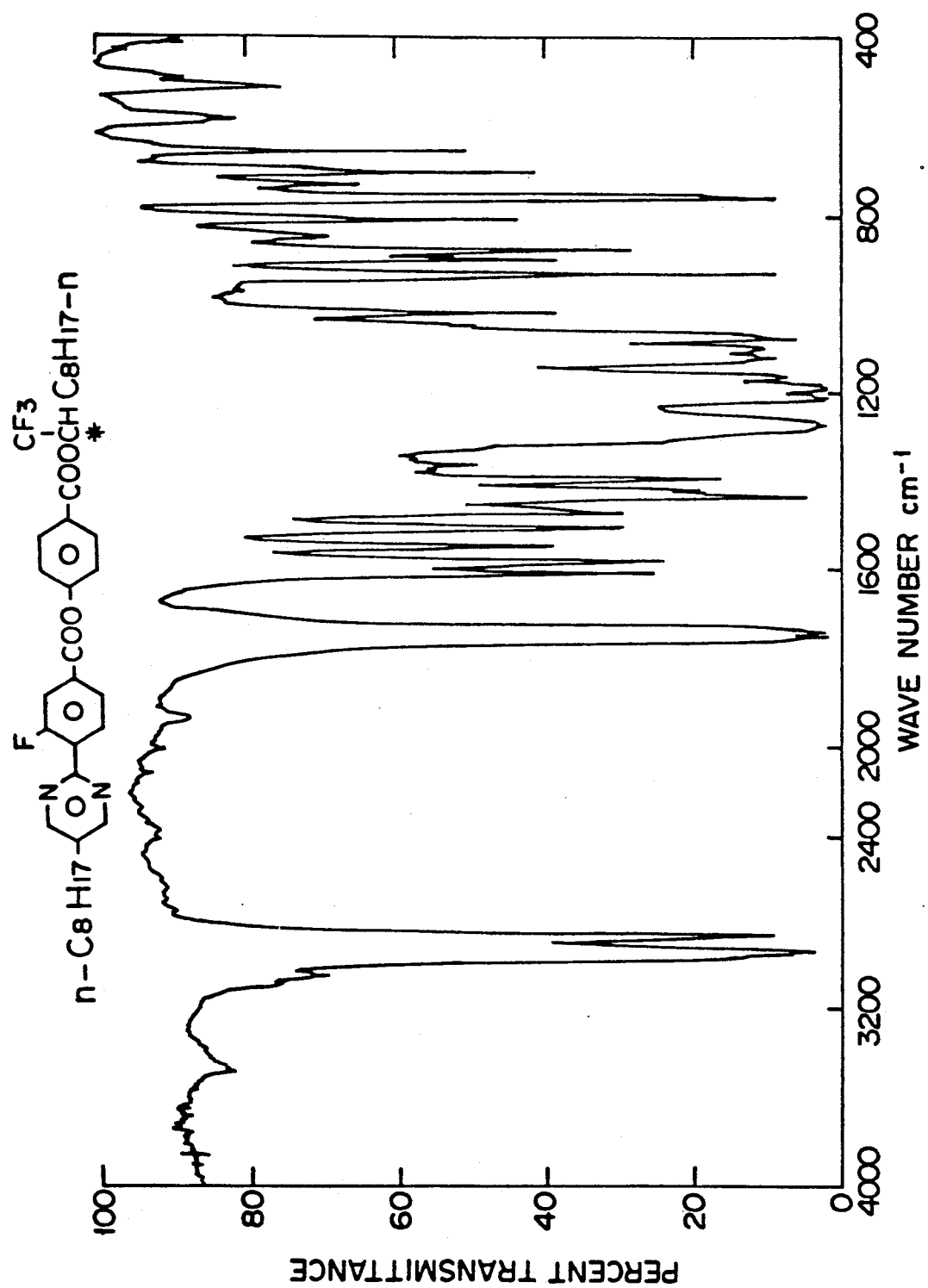

Optical rotation $[\alpha]^{20}_D = +31.00°$
(c = 1.265 CHCl$_3$)
IR spectrum (KBr): FIG. 21
Phase transition temperatures (° C) of the titled compound observed under a polarizing microscope with a hot stage were as follows:

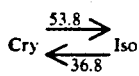

EXAMPLE 22

Preparation of 4-(1,1,1-trifluoro-2-octyloxycarbonyl)-phenyl [3-fluoro-4-(5-n-octyl-pyrimidine-2-yl)]benzoate

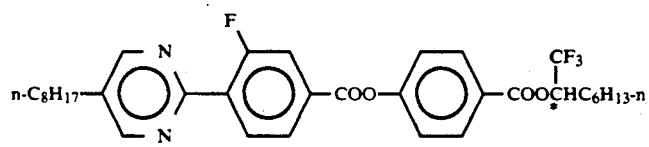

3-Fluoro-4-(5-n-octylpyrimidine-2-yl)benzoic acid (1.72 g) was heated together with excess thionyl chloride for 8 hours under reflux and thereafter, unaltered thionyl chloride was distilled off to obtain 3-fluoro-4-(5-n-octylpyrimidine-2-yl)benzoic acid chloride.

Then, optically active 1,1,1-trifluoro-2-octyl 4-hydroxybenzoate (1.59 g) and triethylamine (1.58 g) were dissolved in chloroform (20 ml) and to the resulting solution was gradually added dropwise a solution of the above prepared 3-fluoro-4-(5-n-octylpyrimidine-2-yl)benzoic acid chloride in chloroform (20 ml), followed by stirring at room temperature for 24 hours.

The reaction mixture was poured in water and was made neutral, and then the chloroform layer was extracted. This was dried over anhydrous magnesium sulfate and the solvent was distilled off. The residue was purified by silica gel column chromatography and recrystallization to obtain the titled compound (2.1 g).

Figure 22:
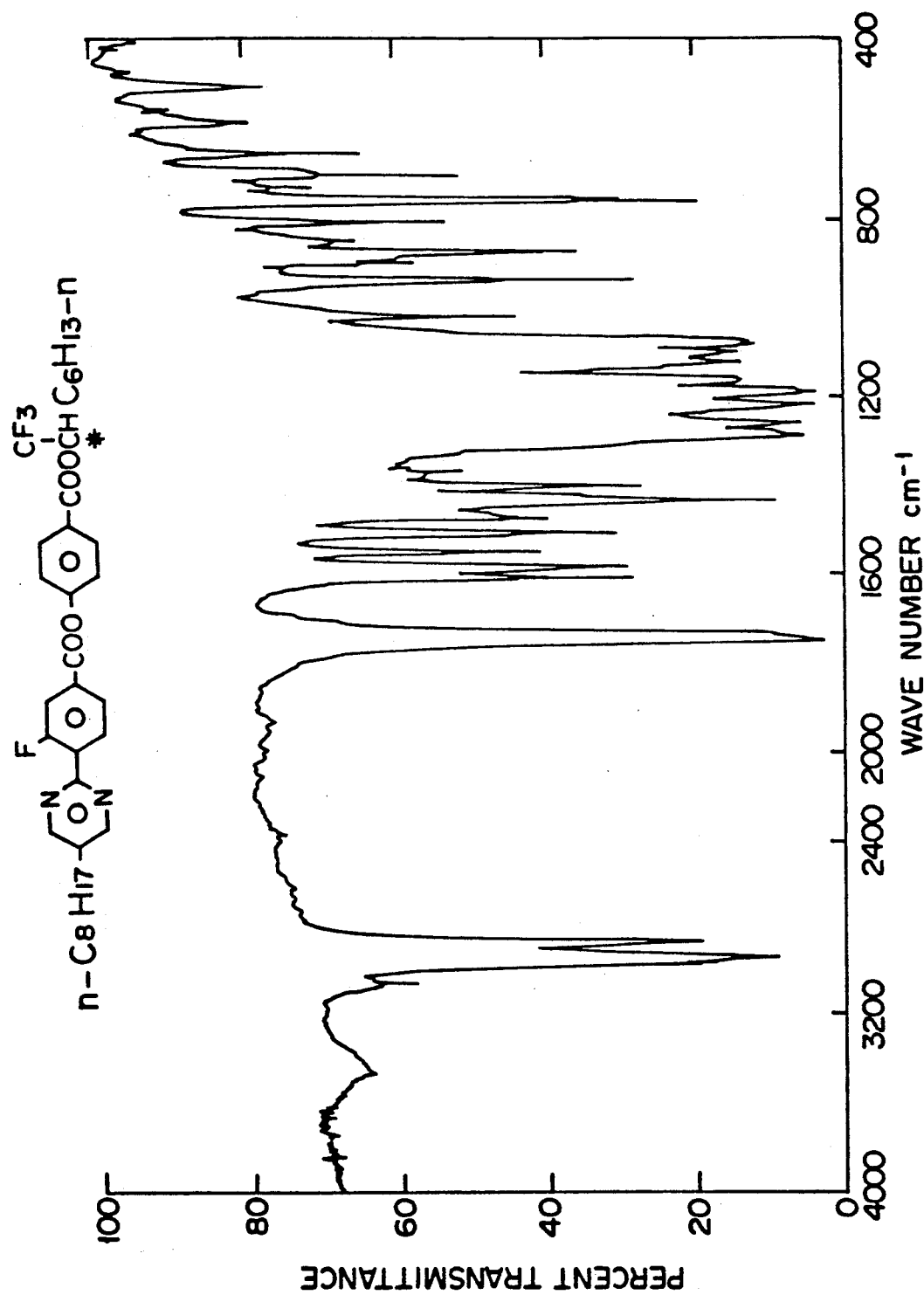

Optical rotation $[\alpha]^{20}_D = +30.87°$ (c=1.030 CHCl₃)
IR spectrum (KBr): FIG. 22
Phase transition temperatures (° C) of the titled compound observed under a polarizing microscope with a hot stage were as follows:

$$Cry \xrightarrow{78.5} Iso$$
$$47.4 \searrow \nearrow 59.9$$
$$SA$$

EXAMPLE 23

Preparation of
4-(1,1,1-trifluoro-2-octyloxycarbonyl)phenyl
2-(4-n-decylphenyl)-pyrimidine-5-yl-carboxylate n-C₁₀H₂₁—⟨phenyl⟩—⟨pyrimidine(N,N)⟩—COO—⟨phenyl⟩—COOCHC₆H₁₃-n, CF₃

2-(4-n-Decylphenyl)pyrimidine-5-ylcarboxylic acid (1.5 g) was heated together with excess thionyl chloride for 4 hours under reflux and thereafter, unaltered thionyl chloride was distilled off to obtain 2-(4-n-decylphenyl)pyrimidine-5-ylcarboxylic acid chloride.

Then, optically active 1,1,1-trifluoro-2-octyl 4-hydroxybenzoate (1.34 g) and triethylamine (1.33 g) were dissolved in chloroform (10 ml) and to the resulting solution was gradually added dropwise a solution of the above prepared 2-(4-n-decylphenyl)pyrimidine-5-yl-carboxylic acid chloride in chloroform (20 ml), followed by stirring at room temperature for 24 hours.

The reaction mixture was poured in water and was made neutral, and then the chloroform layer was extracted. This was dried over anhydrous magnesium sulfate and the solvent was distilled off. The residue was purified by silica gel column chromatography and recrystallization to obtain the titled compound (2.0 g).

Figure 23:
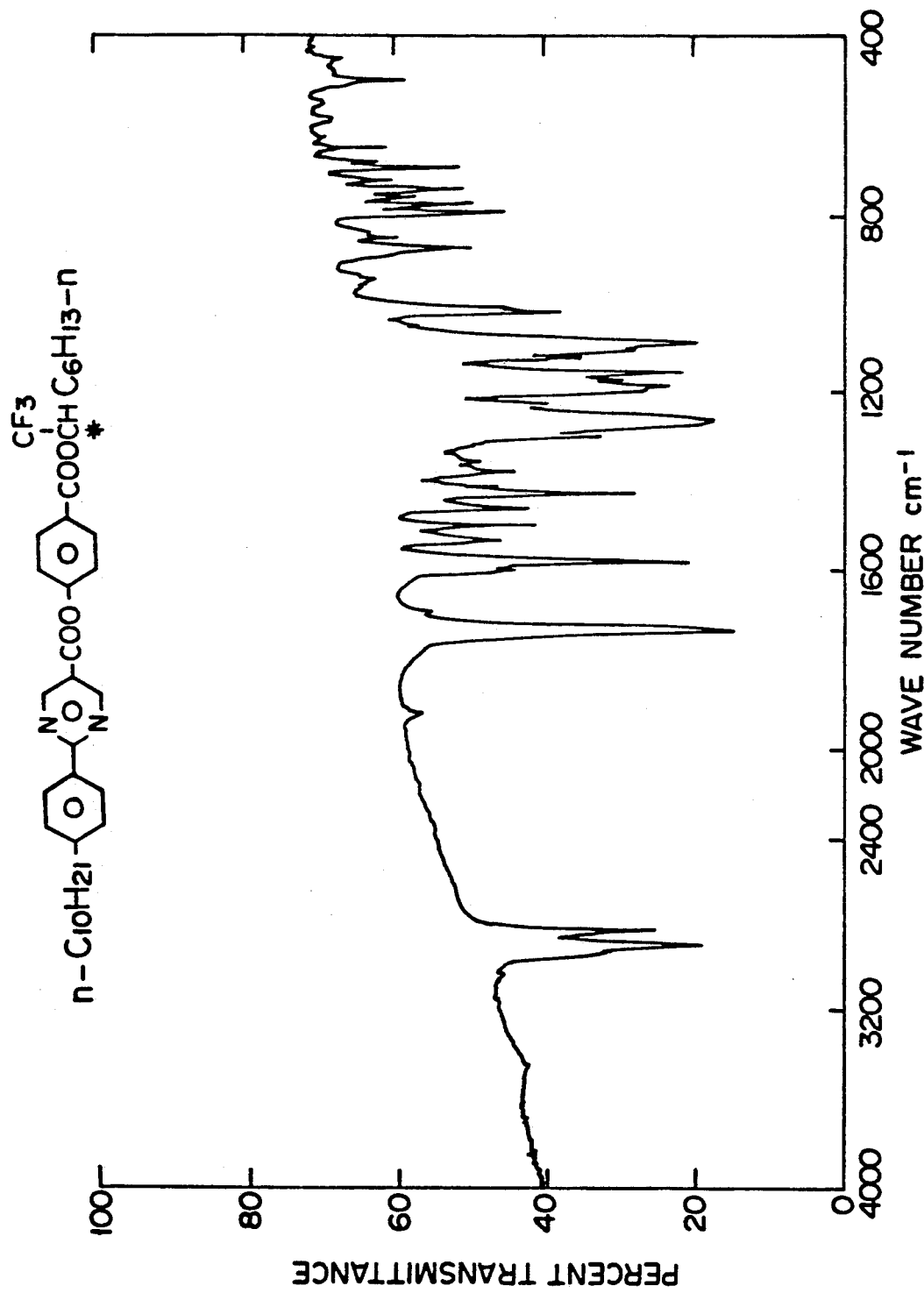

Optical rotation [α]²⁰_D= +31.25°
(c=2.0 CHCl₃)
IR spectrum (KBr): FIG. 23
Phase transition temperatures (° C) of the titled compound observed under a polarizing microscope with a hot stage were as follows:

$$Cry \xrightarrow{65.0} SA \underset{73.9}{\overset{74.0}{\rightleftarrows}} Iso$$
$$23.7 \searrow \nearrow 54.0$$
$$S^*(3)$$

wherein S*(3) shows optical tristable state liquid crystal.

EXAMPLE 24

Preparation of
4-(1,1,1-trifluoro-2-decyloxycarbonyl)phenyl
2-(4-n-decylphenyl)pyrimidine-5-yl-carboxylate n-C₁₀H₂₁—⟨phenyl⟩—⟨pyrimidine(N,N)⟩—COO—⟨phenyl⟩—COOCHC₈H₁₇-n, CF₃

2-(4-n-Decylphenyl)pyrimidine-5-yl-carboxylic acid (1.5 g) was heated together with excess thionyl chloride for 4 hours under reflux and thereafter, unaltered thionyl chloride was distilled off to obtain 2-(4-n-decylphenyl)pyrimidine-5-yl-carboxylic acid chloride.

Then, optically active 1,1,1-trifluoro-2-decyl 4-hydroxybenzoate (1.46 g) and triethylamine (1.34 g) were dissolved in chloroform (15 ml) and to the resulting solution was gradually added dropwise a solution of the above prepared 2-(4-n-decylphenyl)pyrimidine-5-yl-carboxylic acid chloride in chloroform (20 ml), followed by stirring at room temperature for 24 hours.

The reaction mixture was poured in water and was made neutral, and then the chloroform layer was extracted. This was dried over anhydrous magnesium sulfate and the solvent was distilled off. The residue was purified by silica gel column chromatography and recrystallization to obtain the titled compound (1.6 g).

Figure 24:
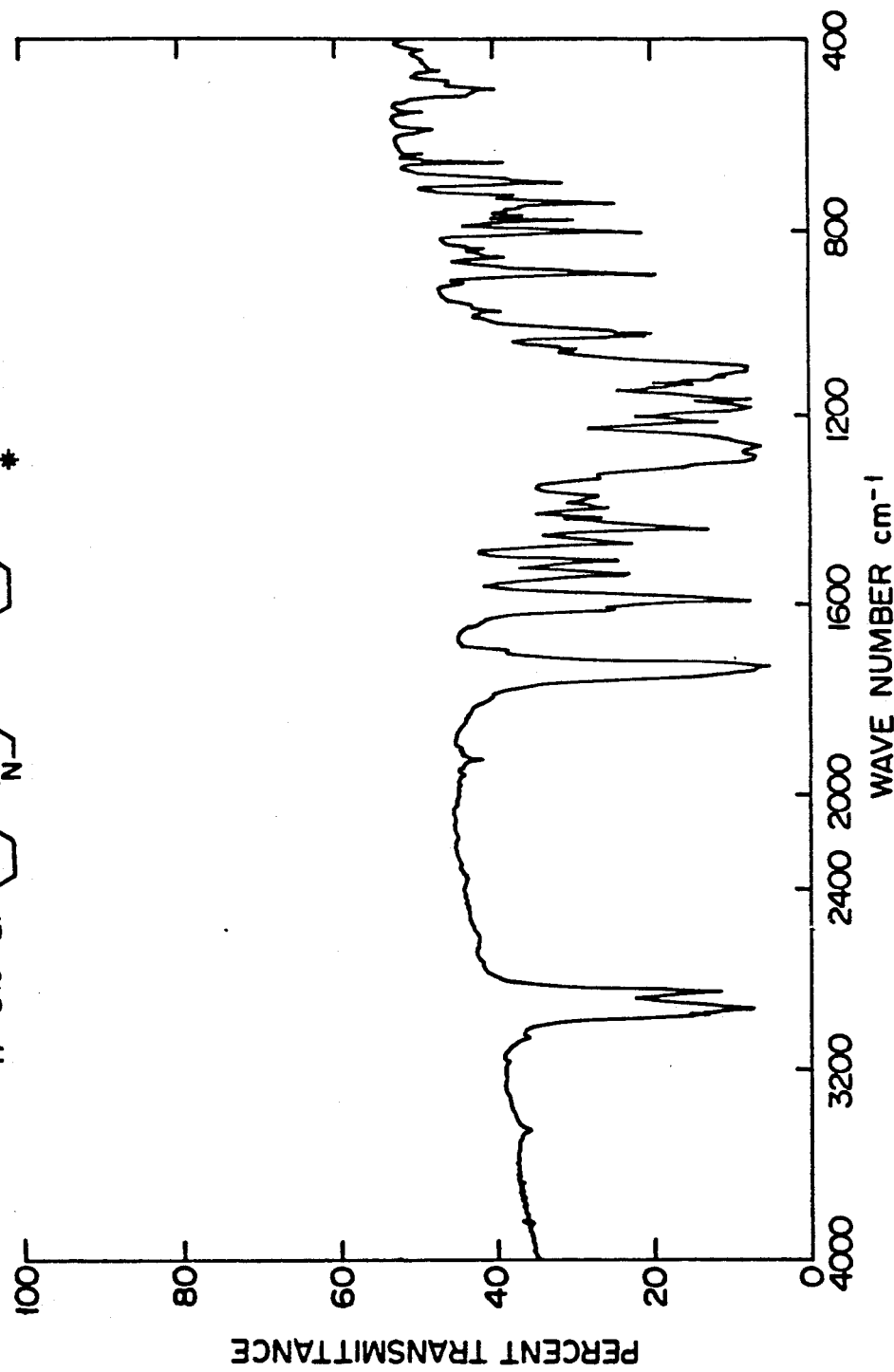

Optical rotation [α]²⁰_D= +30.42°
(c=2.015 CHCl₃)
IR spectrum (KBr): FIG. 24
Phase transition temperatures (° C) of the titled compound observed under a polarizing microscope with a hot stage were as follows:

$$Cry \underset{17.6}{\overset{40.5}{\rightleftarrows}} S^*(3) \underset{45.5}{\overset{46.5}{\rightleftarrows}} SA \underset{62.9}{\overset{63.5}{\rightleftarrows}} Iso$$

wherein S*(3) shows optical tristable state liquid crystal.

EXAMPLE 25

Preparation of
4-(1,1,1-trifluoro-2-octyloxycarbonyl)phenyl
2-(4-n-undecylphenyl)pyrimidine-5-yl-carboxylate n-C₁₁H₂₃—⟨phenyl⟩—⟨pyrimidine(N,N)⟩—COO—⟨phenyl⟩—COOCHC₆H₁₃-n, CF₃

2-(4-n-Undecylphenyl)pyrimidine-5-yl-carboxylic acid (1.7 g) was heated together with excess thionyl chloride for 4 hours under reflux and thereafter, unaltered thionyl chloride was distilled off to obtain 2-(4-n- undecylphenyl)pyrimidine-5-yl-carboxylic acid chloride.

Then, optically active 1,1,1-trifluoro-2-octyl 4-hydroxybenzoate (1.45 g) and triethylamine (1.45 g) were dissolved in chloroform (20 ml) and to the resulting solution was gradually added dropwise a solution of the above prepared 2-(4-n-undecylphenyl)pyrimidine-5-yl-carboxylic acid chloride in chloroform (20 ml), followed by stirring at room temperature for 24 hours.

The reaction mixture was poured in water and was made neutral, and then, only the chloroform layer was extracted. This was dried over anhydrous magnesium sulfate and the solvent was distilled off. The residue was purified by silica gel column chromatography and recrystallization to obtain the titled compound (2.0 g).

Figure 25:
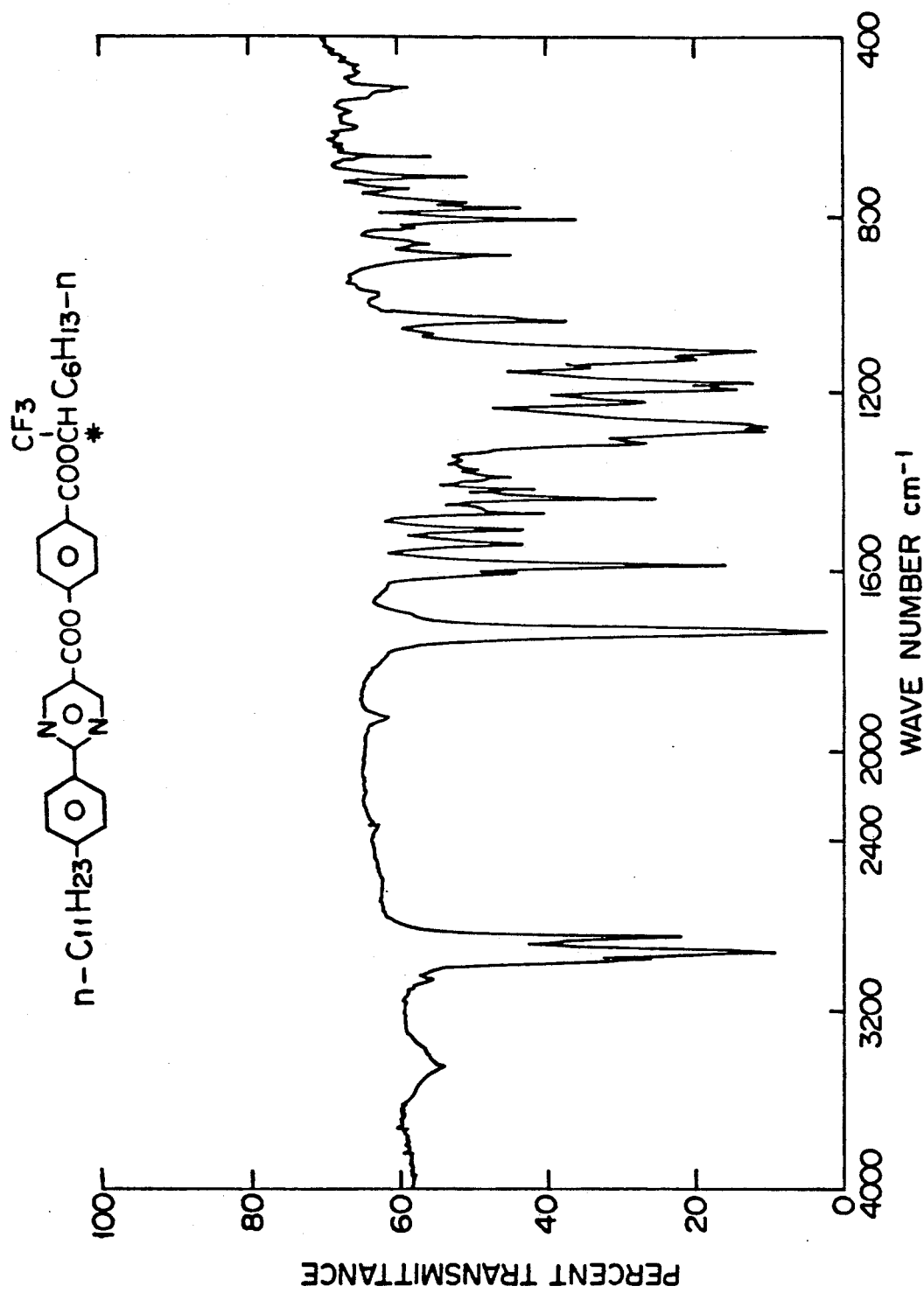

Optical rotation $[\alpha]^{20}_D = +29.90°$
(c = 2.070 CHCl$_3$)
IR spectrum (KBr): FIG. 25
Phase transition temperatures (° C) of the titled compound observed under a polarizing microscope with a hot stage were as follows:

$$Cry \xrightarrow[36.7]{62.5} SA \xrightarrow[76.2]{77.1} Iso$$
$$\searrow \quad \nearrow 61.5$$
$$S^*(3)$$

wherein S*(3) shows optical tristable state liquid crystal.

EXAMPLE 26

Preparation of
4-(1,1,1-trifluoro-2-decyloxycarbonyl)phenyl 2-(4-n-undecylphenyl)pyrimidine-5-yl-carboxylate n-C$_{11}$H$_{23}$—⟨◯⟩—⟨N◯N⟩—COO—⟨◯⟩—COOCHC$_8$H$_{17}$-n
                                                    |
                                                    CF$_3$ 2-(4-n-Undecylphenyl)pyrimidine-5-yl-carboxylic acid (1.7 g) was heated together with excess thionyl chloride for 4 hours under reflux and thereafter, unaltered thionyl chloride was distilled off to obtain 2-(4-n-undecylphenyl)pyrimidine-5-yl-carboxylic acid chloride.

Then, optically active 1,1,1-trifluoro-2-decyl 4-hydroxybenzoate (1.58 g) and triethylamine (1.45 g) were dissolved in chloroform (20 ml) and to the resulting solution was gradually added dropwise a solution of the above prepared 2-(4-n-undecylphenyl)pyrimidine-5-yl-carboxylic acid chloride in chloroform (20 ml), followed by stirring at room temperature for 24 hours.

The reaction mixture was poured in water and was made neutral, and then the chloroform layer was extracted. This was dried over anhydrous magnesium sulfate and the solvent was distilled off. The residue was purified by silica gel column chromatography and recrystallization to obtain the titled compound (2.0 g).

Figure 26:
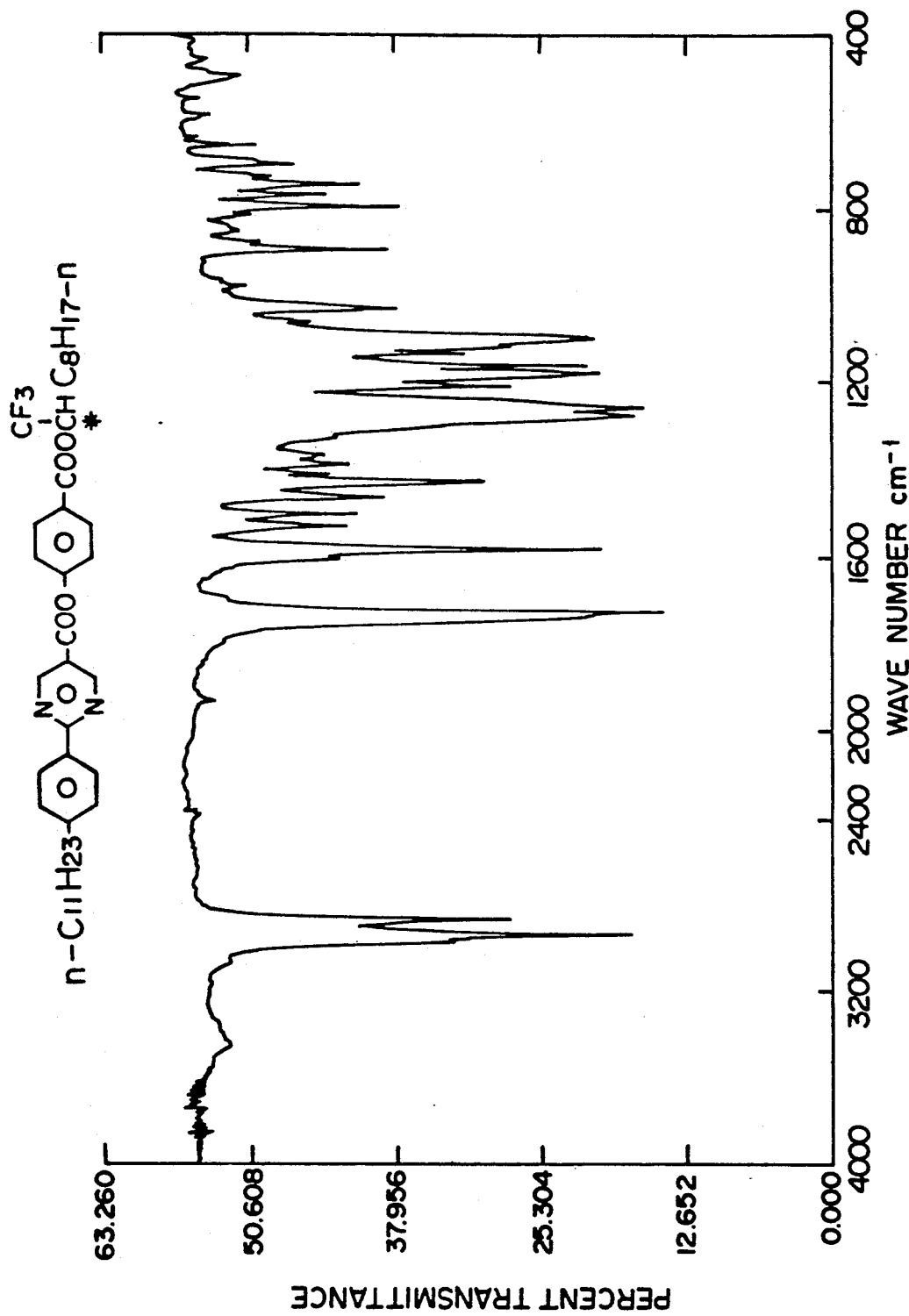

Optical rotation $[\alpha]^{20}_D = +31.19°$
(c = 2.200 CHCl$_3$)
IR spectrum (KBr): FIG. 26
Phase transition temperatures (° C) of the titled compound observed under a polarizing microscope with a hot stage were as follows:

$$Cry \underset{26.5}{\overset{38.0}{\rightleftarrows}} S^*(3) \underset{52.0}{\overset{53.5}{\rightleftarrows}} SA \underset{65.3}{\overset{65.7}{\rightleftarrows}} Iso$$

wherein S*(3) shows optical tristable state liquid crystal.

EXAMPLE 27

Preparation of
4-(1,1,1-trifluoro-2-octyloxycarbonylphenyl [3-fluoro-4-(5-n-octyloxypyrimidine-2-yl)],benzoate n-C$_8$H$_{17}$—O—⟨N◯N⟩—⟨◯(F)⟩—COO—⟨◯⟩—COOCHC$_6$H$_{13}$-n
                                                              |
                                                              CF$_3$ 3-Fluoro-4-(5-n-octyloxypyrimidine-2-yl)benzoic acid (1.70 g) was heated together with excess thionyl chloride for 8 hours under reflux and thereafter, unaltered thionyl chloride was distilled off to obtain 3-fluoro-4-(5-n-octyloxypyrimidine-2-yl)benzoic acid chloride.

Then, optically active 1,1,1-trifluoro-2octyl 4-hydroxybenzoate (1.48 g) and triethylamine (1.24 g) were dissolved in chloroform (20 ml) and to the resulting solution was gradually added dropwise a solution of the above prepared 3-fluoro-4-(5-n-octyloxypyrimidine-2-yl)benzoic acid chloride in chloroform (20 ml), followed by stirring at room temperature for 24 hours.

The reaction mixture was poured in water and was made neutral, and then the chloroform layer was extracted. This was dried over anhydrous magnesium sulfate and the solvent was distilled off. The residue was purified by silica gel column chromatography and recrystallization to obtain the titled compound (2.2 g).

Figure 27:
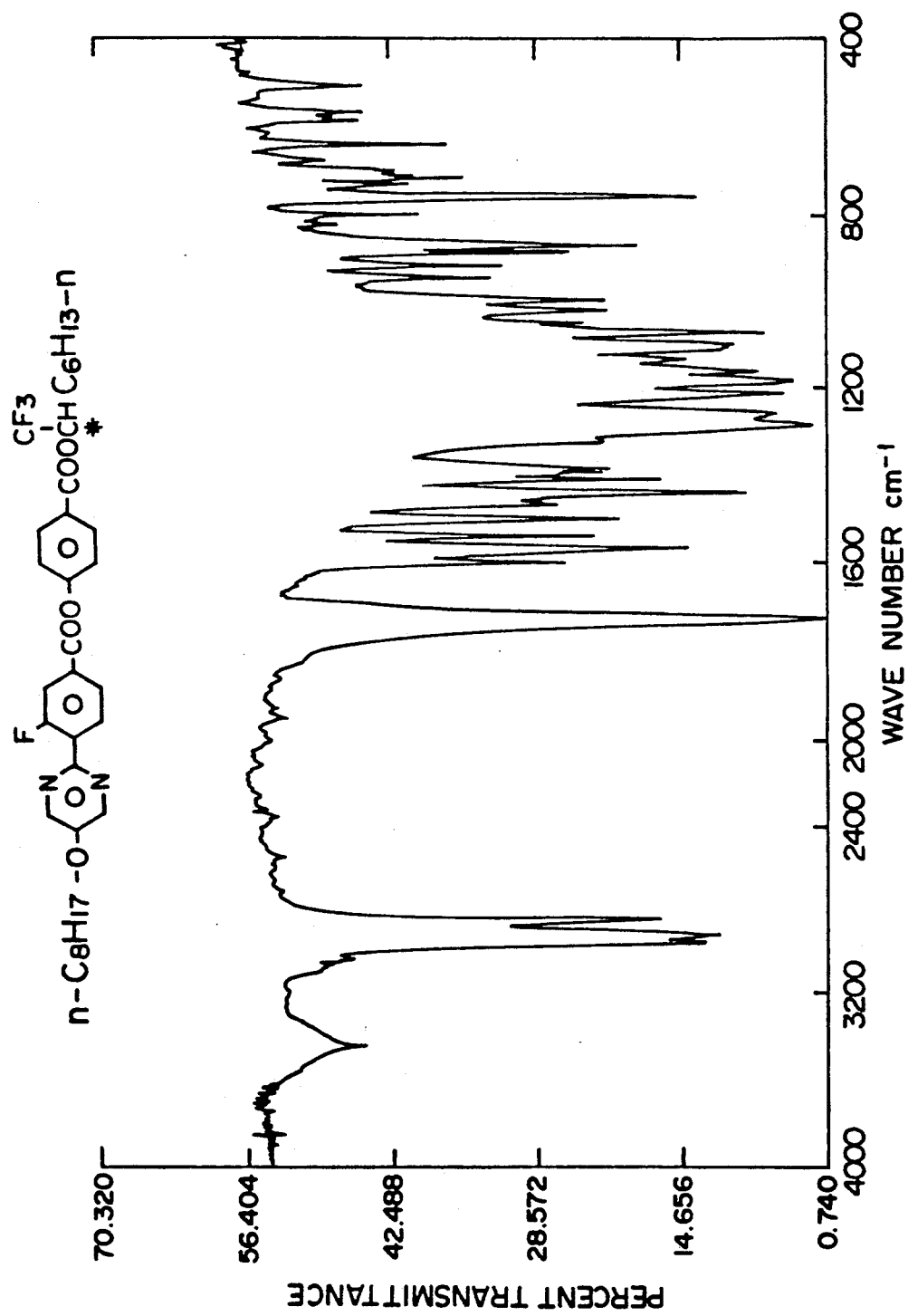

Optical rotation $[\alpha]^{20}_D = +29.81°$
(c = 2.145 CHCl$_3$)
IR spectrum (KBr): FIG. 27
Phase transition temperatures (° C) of the titled compound observed under a polarizing microscope with a hot stage were as follows:

$$Cry \xrightarrow{78.5} Iso$$
$$\searrow_{47.4} \quad \nearrow_{59.9}$$
$$SA$$

EXAMPLE 28

Preparation of 4-(1,1,1-trifluoro-2-decyloxycarbonyl)phenyl [3-fluoro-4-(5-n-octyloxypyrimidine-2-yl)]benzoate

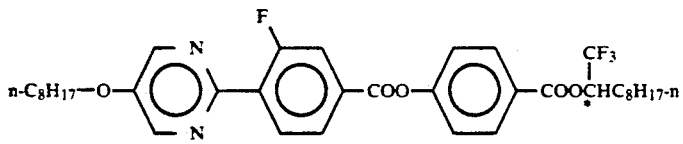

3-Fluoro-4-(5-n-octyloxypyrimidine-2-yl)benzoic acid (1.60 g) was heated together with excess thionyl chloride for 8 hours under reflux and thereafter, unaltered thionyl chloride was distilled off to obtain 3-fluoro-4-(5-n-octyloxypyrimidine-2-yl)benzoic acid chloride.

Then, optically active 1,1,1-trifluoro-2-decyl 4-hydroxybenzoate (1.52 g) and triethylamine (1.40 g) were dissolved in chloroform (20 ml) and to the resulting solution was gradually added dropwise a solution of the above prepared 3-fluoro-4-(5-n-octyloxypyrimidine-2-yl)benzoic acid chloride in chloroform (20 ml), followed by stirring at room temperature for 24 hours.

The reaction mixture was poured in water and was made neutral, and then the chloroform layer was extracted. This was dried over anhydrous magnesium sulfate and the solvent was distilled off. The residue was purified by silica gel column chromatography and recrystallization to obtain the titled compound (2.4 g).

Figure 28:
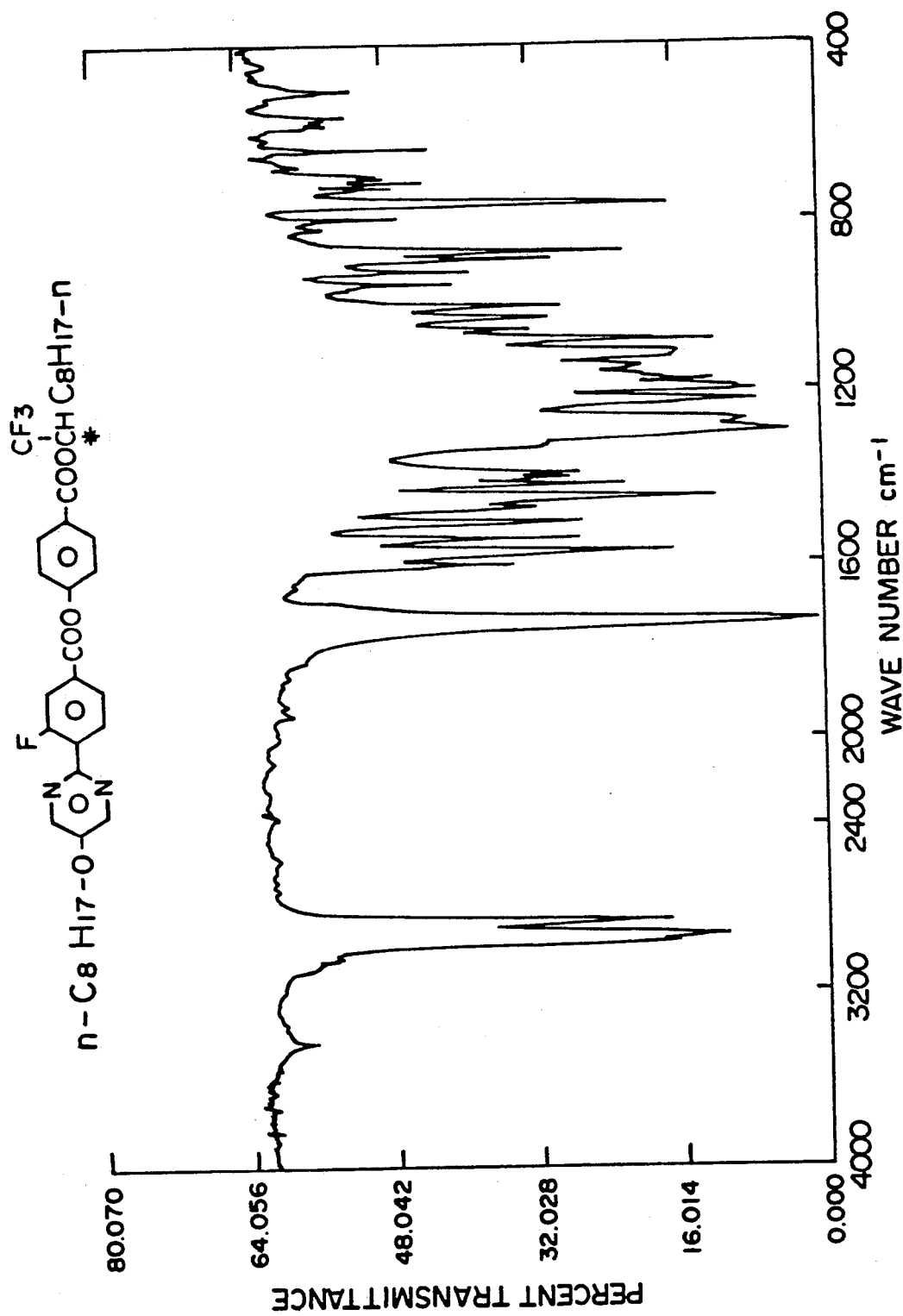

Optical rotation $[\alpha]^{20}_D = +29.62°$
(c = 2.075 CHCl$_3$)
IR spectrum (KBr): FIG. 28

Phase transition temperatures (° C) of the titled compound observed under a polarizing microscope with a hot stage were as follows:

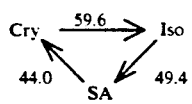

wherein S*(3) shows optically tristable state liquid crystal phase.

EXAMPLE 29

In liquid crystal cells of 1.6 μm in cell thickness wherein polyimide alignment films which had been subjected to rubbing treatments were placed on ITO electrode substrates, were filled the liquid crystal compound 3-fluoro-4-(1,1,1-trifluoro-2-octyloxycarbonyl)-phenyl 4-(5-n-decylpyrimidine-2-yl)benzoate of isotropic phase obtained in Example 1 to make liquid crystal thin film cells.

Figure 29:
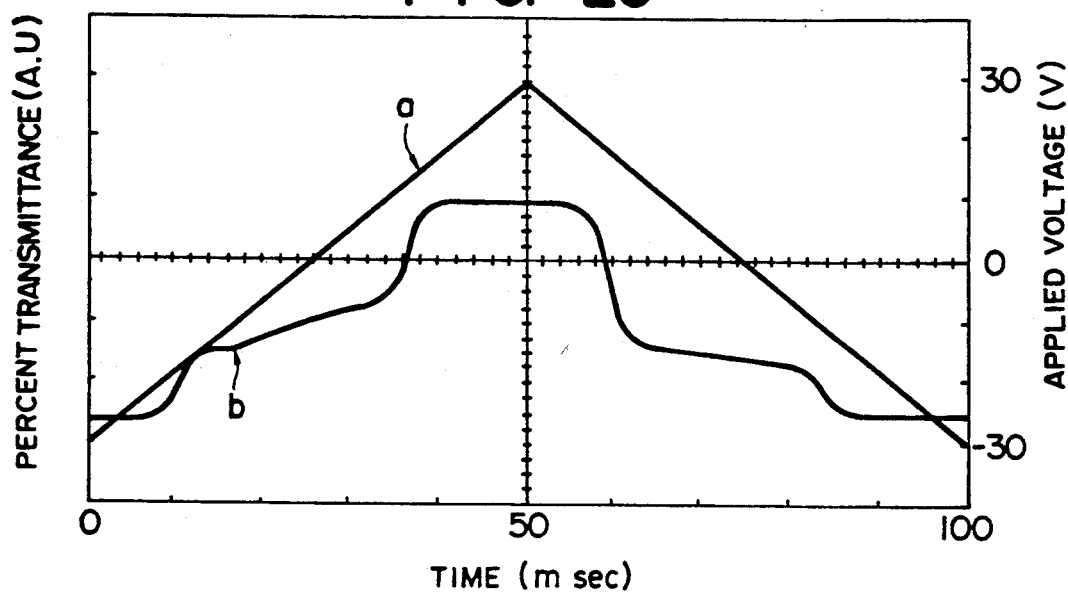
FIG. 29 shows hysteresis good in memory effect of dark portion shown by the tristable state compound of the present invention where (a) shows an applied triangular wave voltage and (b) shows in light transmittance for the applied triangular wave voltage.

In polarizing microscopes with photomultipliers wherein two polarizing plates were crossed at right angles, were placed the liquid crystal cells obtained above so that the direction of long axes of molecules turned parallel to polarizers when a direct voltage of −30 V was applied. The liquid crystal cells were slowly cooled with temperature gradient of 0.1°-1.0° C./min. to S*c phases. After further cooling, triangular wave voltage of ±30 V, 10 Hz was applied to the temperature range of 60°-45° C. (FIG. 29). It was observed that light transmittance changed in three states, i.e., darkness when applied voltage was minus, intermediate when the voltage was zero and brightness when the voltage plus. Presence of three stable alignment of liquid crystals was acknowledged.

The same effects were acknowledged on the compounds of other examples in the similar S*(3) phase.

EXAMPLE 30

The liquid crystal compound 4-(1,1,1-trifluoro-2-octyloxycarbonyl)phenyl 2-(4-n-octyloxyphenyl)-pyrimidine-5-yl-carboxylate of isotropic phase obtained in Example 4 was filled in the same cells as used in Example 29 to make liquid crystal thin film cells.

The liquid crystal cells were placed in a polarizing microscope with photomultipliers wherein two polarizing plates were crossed at right angles so that dark field was formed when no voltage was applied.

Figure 30A:
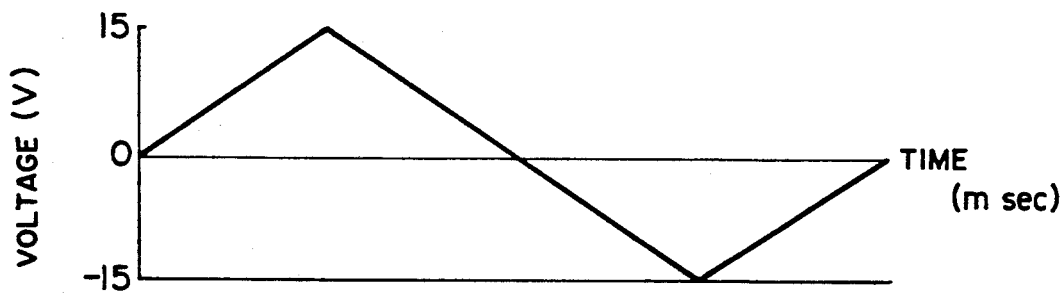
FIGS. 30a, 30b, 31a and 31b show hysteresis good in memory effect of dark portion shown by the tristable state liquid crystal compounds of Examples 8 and 9.
Figure 30B:
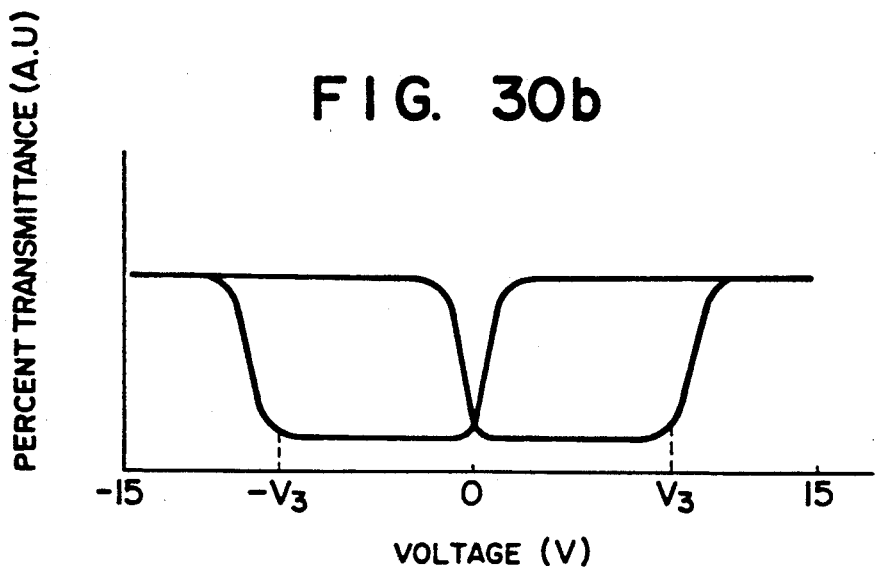

The liquid crystal cells were slowly cooled with temperature grade of 0.1°-1.0° C./min. to SA phase. Further cooling was carried out and triangular wave voltage of ±15 V, 10 Hz as shown in FIG. 30a was applied at the temperature range of 96°-71.5° C. The hysteresis as shown in FIG. 30b was obtained from the relation between applied voltage and percentage transmittance at 90° C.

Change in percentage transmittance in the dark portion at 0 V − +V$_3$, O V − −V$_3$ This indicates that memory effect of the dark portion was very good.

EXAMPLE 31

The liquid crystal compound 3-fluoro-4(1,1,1-trifluoro-2-octyloxycarbonyl)phenyl 2-(4-n-octyloxyphenyl)pyrimidine-5-yl-carboxylate of isotropic phase obtained in Example 6 was filled in the same cells as used in Example 29 to make liquid crystal thin film cells.

The liquid crystal cells were placed in a polarizing microscope with photomultipliers wherein two polarizing plates were crossed at right angles so that dark field was formed when no voltage was applied.

Figure 31A:
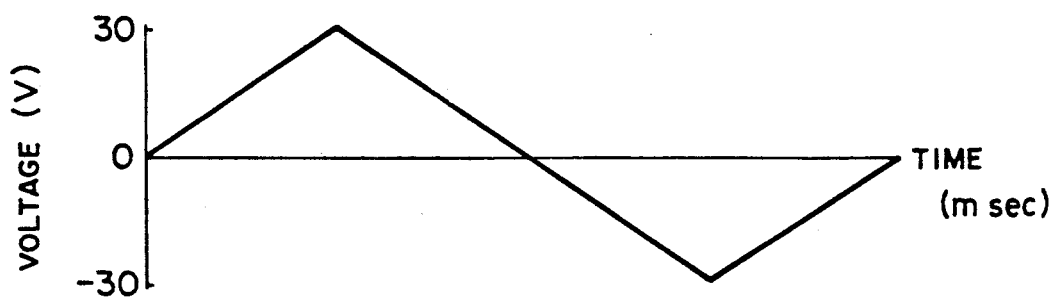
Figure 31B:
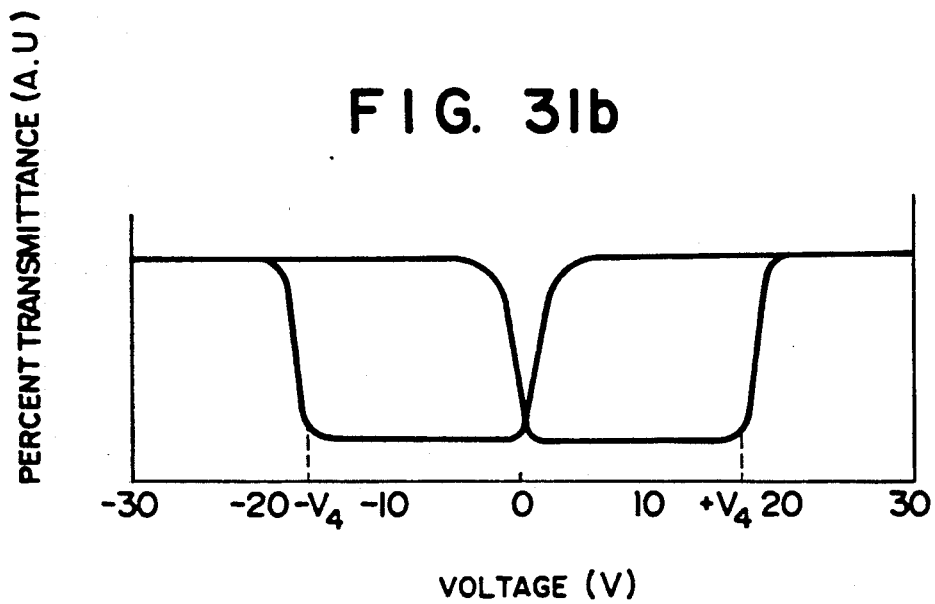

The liquid crystal cells were slowly cooled with temperature grade of 0.1°-1.0° C./min. to SA phase. Further cooling was carried out and triangular wave voltage of ±30 V, 10 Hz as shown in FIG. 31a was applied at the temperature range of 103°-51° C. The hysteresis as shown in FIG. 31b was obtained from the relation between applied voltage and percentage transmittance at 100° C.

Change in percentage transmittance of the dark portion at O V−+V$_4$, O V−−V$_4$ was very small. This indicates that memory effect of the dark portion was very good.

The novel liquid crystals of the present invention have tristable state and have a wide variety of uses such as display devices and switching devices.

We claim:

1. An optically active liquid crystal compound which exhibits tristable states when the optically active liquid crystal compound is in the S*(3) phase and which is represented by the formula

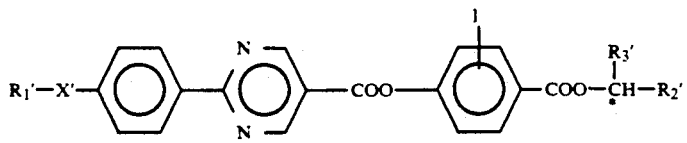

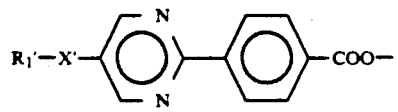

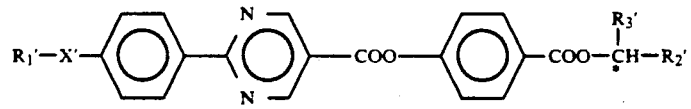

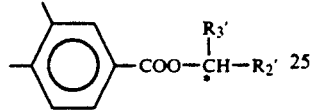

wherein $R_1'$ and $R_2'$ each represents an alkyl group of 4–18 carbon atoms, $R_3'$ represents $CF_3$ or $C_2F_5$, X' represents O or a single bond, and l' shows substitution by a fluorine atom.

2. An optically active liquid crystal compound which exhibits tristable states when the optically active liquid crystal compound is in the S*(3) phase and which is represented by the formula

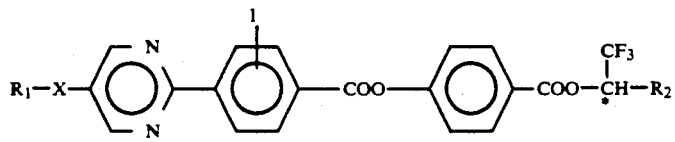

wherein $R_1'$ and $R_2'$ each represents an alkyl group of 4–18 carbon atoms, $R_3'$ represents $CF_3$ or $C_2F_5$, and X' represents O or a single bond.

3. An optically active liquid crystal compound which exhibits tristable states when the optically active liquid crystal compound is in the S*(3) phase and which is represented by the formula wherein $R_1'$ and $R_2'$ each represents an alkyl group of 4–18 carbon atoms, $R_3'$ represents $CF_3$ or $C_2F_5$, X' represents O or a single bond, and l shows substitution by at least one fluorine atom.

4. An optically active liquid crystal compound which is represented by the formula:

wherein $R_1$ and $R_2$ each represents an alkyl group of 4–18 carbon atoms, X represents and oxygen atom or a single bond and l shows substitution by at least one fluorine atom.

5. An optically active liquid crystal compound according to claim 1, wherein $R_3'$ represents $CF_3$.

6. An optically active liquid crystal compound according to claim 1, wherein $R_3'$ represents $C_2F_5$.

7. An optically active liquid crystal compound according to claim 2, wherein $R_3'$ represents $CF_3$.

8. An optically active liquid crystal compound according to claim 2, wherein $R_3'$ represents $C_2F_5$.

9. An optically active liquid crystal compound according to claim 3, wherein $R_3'$ represents $CF_3$.

10. An optically active liquid crystal compound according to claim 3, wherein $R_3'$ represents $C_2F_5$.

* * * * *